United States Patent
Wong et al.

(10) Patent No.: US 10,855,346 B2
(45) Date of Patent: Dec. 1, 2020

(54) MASSIVE MIMO ARCHITECTURE

(71) Applicant: NATIONAL INSTRUMENTS CORPORATION, Austin, TX (US)

(72) Inventors: Ian C. Wong, Austin, TX (US); Karl F. Nieman, Austin, TX (US); Nikhil U. Kundargi, Austin, TX (US)

(73) Assignee: National Instruments Corporation, Austin, TX (US)

(*) Notice: Subject to any disclaimer, the term of this patent is extended or adjusted under 35 U.S.C. 154(b) by 423 days.

(21) Appl. No.: 14/703,214

(22) Filed: May 4, 2015

(65) Prior Publication Data

US 2015/0326286 A1 Nov. 12, 2015

Related U.S. Application Data

(60) Provisional application No. 62/024,885, filed on Jul. 15, 2014, provisional application No. 62/024,896, (Continued)

(51) Int. Cl.
*H04L 7/00* (2006.01)
*H04B 7/0413* (2017.01)
(Continued)

(52) U.S. Cl.
CPC .......... *H04B 7/0456* (2013.01); *H04B 7/024* (2013.01); *H04B 7/0413* (2013.01);
(Continued)

(58) Field of Classification Search
CPC ... H04L 7/0012; H04L 7/0025; H04L 5/0048; H04B 7/0413; H04B 7/024;
(Continued)

(56) References Cited

U.S. PATENT DOCUMENTS 8,756,565 B2 6/2014 Graf
2004/0136349 A1 7/2004 Walton et al.
(Continued)

FOREIGN PATENT DOCUMENTS

| EP | 2278731 | * | 1/2011 | ............ H04W 56/00 |
| EP | 2278731 A2 | | 1/2011 | |
| WO | WO 2013133645 A1 | | 12/2013 | |

OTHER PUBLICATIONS

International Search Report for Application No. PCT/US2015/029550, dated Jul. 14, 2015 (5 pages).
(Continued)

*Primary Examiner* — Andrew Lai
*Assistant Examiner* — M Mostazir Rahman
(74) *Attorney, Agent, or Firm* — Kowert Hood Munyon Rankin and Goetzel PC; Jeffrey C. Hood

(57) ABSTRACT

Techniques are disclosed relating to a massive MIMO base station architecture. In some embodiments, a base station is configured to combine signals received by multiple antennas and, for at least a subset of processing elements included in the base station, each processing element is configured to operate on a different portion of the combined signals. In these embodiments, each portion includes signals from multiple antennas. In some embodiments, the portions are different time and/or frequency portions of the combined signals. In some embodiments, this distributed processing may allow the number of antennas of the base station to scale dramatically, provide dynamic re-configurability, facilitate real-time reciprocity-based precoding, etc.

19 Claims, 14 Drawing Sheets

Related U.S. Application Data filed on Jul. 15, 2014, provisional application No. 62/024,872, filed on Jul. 15, 2014, provisional application No. 61/989,784, filed on May 7, 2014.

(51) Int. Cl.
| | |
|---|---|
| *H04B 7/0456* | (2017.01) |
| *H04B 7/024* | (2017.01) |
| *H04L 5/00* | (2006.01) |
| *H04W 56/00* | (2009.01) |
| *H04B 7/0452* | (2017.01) |
| *H04W 88/08* | (2009.01) |

(52) U.S. Cl.
CPC ......... *H04B 7/0452* (2013.01); *H04L 5/0048* (2013.01); *H04L 7/0012* (2013.01); *H04L 7/0025* (2013.01); *H04W 56/00* (2013.01); *H04W 88/08* (2013.01); *H04W 88/085* (2013.01)

(58) Field of Classification Search
CPC ... H04B 7/0456; H04B 7/0452; H04W 88/08; H04W 56/00; H04W 88/085
USPC ....................................................... 370/329
See application file for complete search history.

(56) References Cited

U.S. PATENT DOCUMENTS

| | | |
|---|---|---|
| 2010/0046650 A1 | 2/2010 | Jongren et al. |
| 2010/0246457 A1 | 9/2010 | Zhou |
| 2012/0319885 A1* | 12/2012 | Chang ................... H03F 1/0277 341/155 |
| 2013/0219355 A1 | 8/2013 | Brown |
| 2013/0219360 A1 | 8/2013 | Graf |
| 2013/0287001 A1* | 10/2013 | Sahlin ............... H04W 72/0426 370/330 |
| 2014/0185698 A1* | 7/2014 | Jongren ............... H04B 7/0413 375/267 |
| 2015/0016441 A1* | 1/2015 | Hanson ................. H04W 16/02 370/338 |
| 2015/0049824 A1 | 2/2015 | Kim |

OTHER PUBLICATIONS

Notification of the First Office Action in Chinese Application No. 201580032055.3 dated Mar. 5, 2019, 12 pages.

* cited by examiner

Establish Fixed Relationship with Reference Clock:

Reference Clock 810

Sampling Clock 820

CPTRs Prior to Alignment:

Device A CPTR 830

Device B CPTR 840

Aligned CPTRs:

Device A CPTR 830

Device B CPTR 840

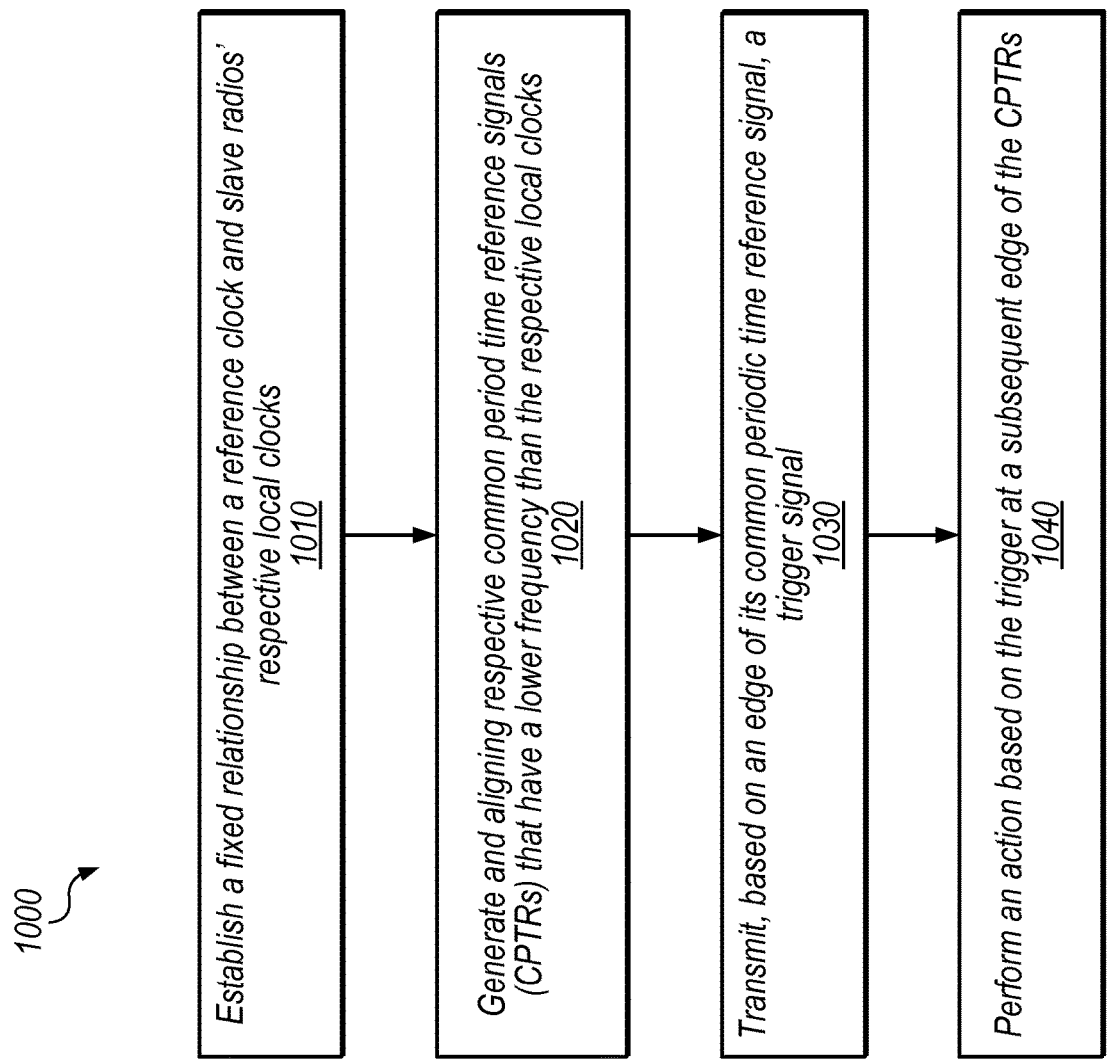

MASSIVE MIMO ARCHITECTURE

This application claims the benefit of U.S. Provisional Application No. 61/989,784, filed on May 7, 2014, U.S. Provisional Application No. 62/024,872, filed on Jul. 15, 2014, U.S. Provisional Application No. 62/024,885, filed on Jul. 15, 2014, and U.S. Provisional Application No. 62/024,896, filed on Jul. 15, 2014, which are herein incorporated by reference in their entirety as though fully and completely set forth herein.

BACKGROUND

1. Technical Field

This disclosure relates to wireless communication systems and more particularly to multiple input, multiple output (MIMO) communications.

2. Description of the Related Art

Modern communication systems rely upon multiple antennas at the transmitter and/or receiver to enhance link performance. This class of techniques, known as multiple input, multiple output (MIMO) exploits the spatial dimension by employing spatial encoding and/or decoding. Massive MIMO is an exciting theoretical area of 5G wireless that promises significant gains that offer the ability to accommodate more users, at higher data rates, with better reliability, while consuming less power. Conventional MIMO base stations typically use six or eight antennas in a sectorized topology, but massive MIMO base stations utilize more than eight antennas (and sometimes as many as 128, 256, or more) while massive MIMO user equipment devices (UEs) may typically utilize around eight antennas. Using the larger number of antenna elements, massive MIMO reduces power in a given channel by focusing the energy to targeted mobile users using precoding techniques. By directing the wireless energy to specific users, the power in channel is reduced and, at the same time, interference to other users is decreased.

The introduction of so many antenna elements, however, introduces several system challenges not encountered in conventional networks. For example, conventional data networks may use LTE or LTE-Advanced, which in turn use the pilot tones in an orthogonal frequency division multiplexing (OFDM) waveform to estimate the channel condition. With many antennas and transmitters, a massive MIMO system, may essentially run out of unique pilot tones for a receiver to effectively detect and resolve channel conditions. Further, processing and synchronization requirements for massive MIMO may be difficult to meet using conventional systems.

Therefore both test systems for prototyping different MIMO techniques and approaches and production MIMO systems configured to utilize these techniques are desired.

SUMMARY

Techniques are disclosed relating to massive MIMO communications.

In some embodiments, a base station includes a plurality of antennas, a plurality of processing elements coupled to the plurality of antennas and configured to perform processing for wireless communications via the plurality of antennas, and an interconnect configured to couple the plurality of processing elements. In these embodiments, the base station is configured to combine signals received by multiple antennas. In these embodiments, for at least a subset of the processing elements, each processing element is configured to operate on a different portion of the combined signals, where each portion includes signals from multiple antennas.

In some embodiments, a large antenna count system includes a master device, a plurality of slave radios communicatively coupled to the master device and to respective antennas in the large antenna clock system, and a clock and trigger distribution system, coupled to the master device and the plurality of slave radios. In these embodiments, each slave includes a local clock and the clock and trigger distribution system comprises a hierarchy of clock and trigger distribution modules. In these embodiments, the plurality of slave radios are configured to establish and maintain a fixed relationship between a reference clock and their respective local clocks, where the reference clock is distributed via the clock and trigger distribution system. In these embodiments, the master device and the plurality of slave radios are configured to generate and align respective common periodic time reference signals that have a lower frequency than the respective local clocks. In these embodiments, the master device is configured to transmit, based on an edge of its common periodic time reference signal, a trigger signal via the clock and trigger distribution system to the plurality of slave radios. In these embodiments, the plurality of slave radios are configured to perform an action based on the trigger at a subsequent edge of their common periodic time reference signals. In some embodiments the master device is configured similarly to the slave devices, at least in the sense that it also includes a local clock, is configured to establish and maintain a fixed relationship between a reference clock and its local clock, and is configured to perform an action based on the trigger at the subsequent edge of its common period time reference signal.

In some embodiments, an apparatus includes a plurality of antennas, a plurality of radios configured to perform wireless communication with one or more mobile devices, and one or more processing elements coupled to the plurality of radios. In these embodiments, the apparatus is configured to receive an uplink pilot symbol from a mobile device over a first channel, receive uplink data from the mobile device over the first channel, where the uplink data is included in one or more orthogonal frequency division multiplexing (OFDM) symbols at a symbol rate, determine channel information based on the pilot symbol, precode downlink data based on the channel information, and transmit, via one or more of the plurality of antennas, the precoded downlink data to the mobile device. In these embodiments, a transition interval between receiving the uplink pilot symbol and beginning to transmit the precoded downlink data corresponds to less than five OFDM symbols at the symbol rate.

BRIEF DESCRIPTION OF THE DRAWINGS

FIGS. 8A-9A are timing diagrams illustrating exemplary synchronization techniques according to some embodiments.

FIG. 10 is a flow diagram illustrating a method for synchronization of radio circuitry, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component.

DETAILED DESCRIPTION

Figure 1:
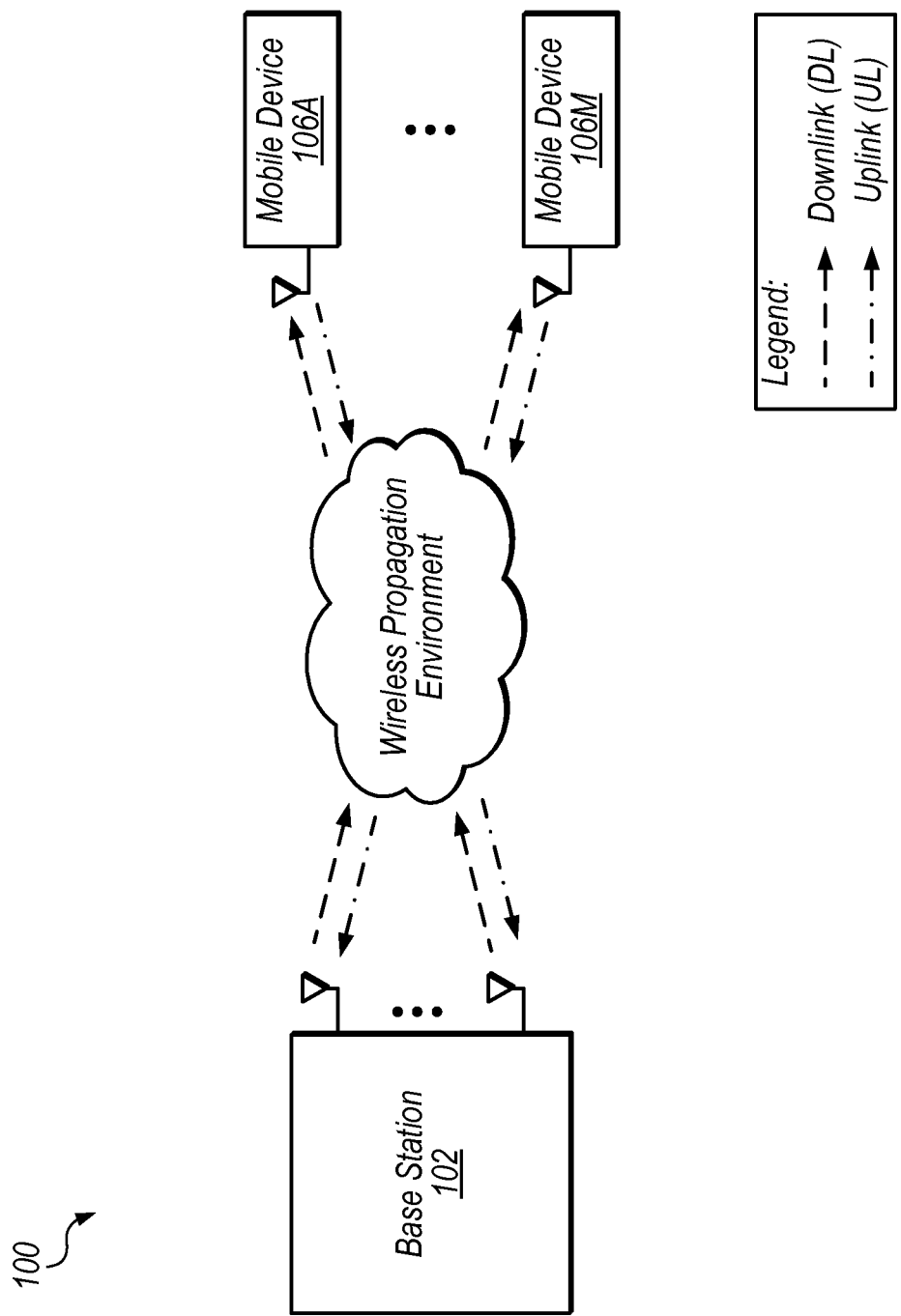
FIG. 1 is a block diagram illustrating MIMO communications in a wireless propagation environment, according to some embodiments.
Figure 2:
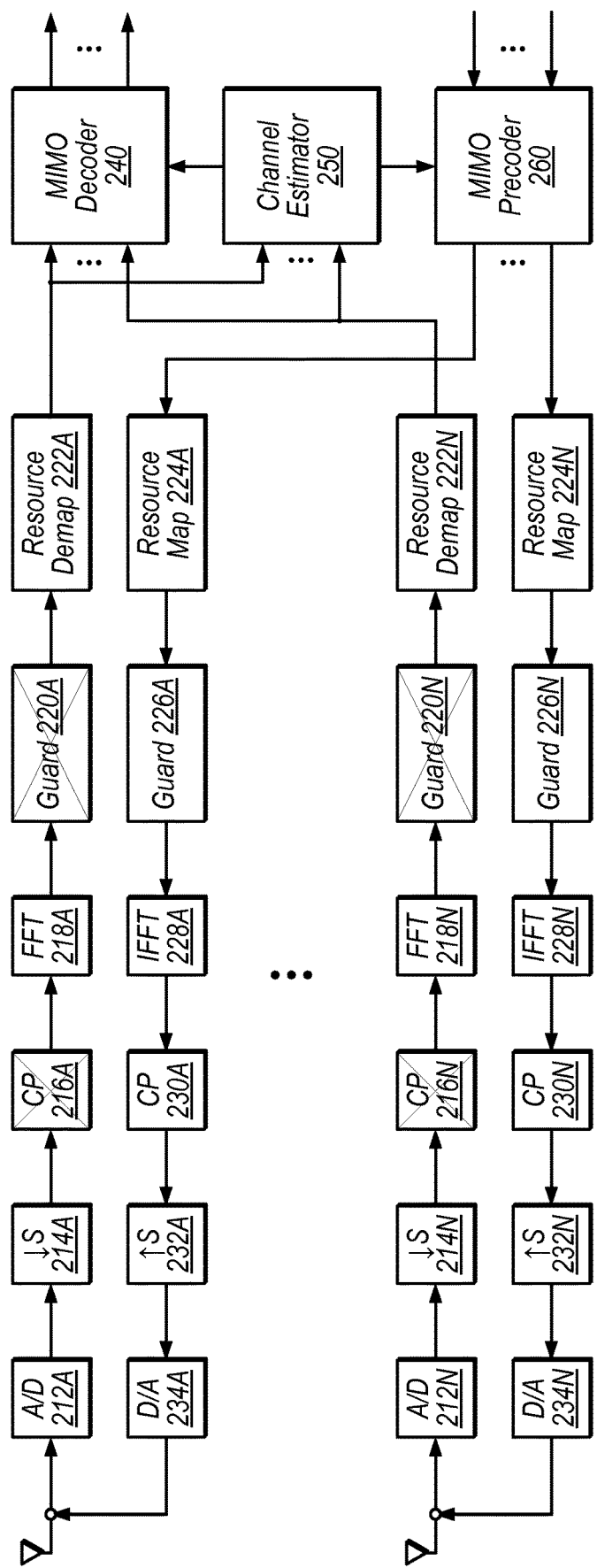
FIG. 2 is a block diagram illustrating exemplary send and receive processing chains for reciprocity-based MIMO, according to some embodiments.

This disclosure initially describes, with reference to FIGS. 1-2, an overview of exemplary multiple-input multiple-output (MIMO) communications and processing. Generally, MIMO technology may exploit multipath propagation to increase radio capacity, performance, and/or range using multiple transmit and receive antennas. Exemplary massive MIMO systems are then discussed with reference to FIGS. 3-6. Exemplary synchronization techniques for MIMO systems are discussed with reference to FIGS. 7-10. Exemplary frame structures to facilitate utilization of channel reciprocity are discussed with reference to FIGS. 11-13. In some embodiments, a massive MIMO system is configured as a versatile, flexible, and scalable massive MIMO platform for real-time, two-way communication. The disclosed systems and techniques may be used in a production environment and/or in test environments.

ACRONYMS

The following acronyms are used in the present disclosure.

3GPP: Third Generation Partnership Project
3GPP2: Third Generation Partnership Project 2
BER: Bit Error Rate
CDMA: Code Division Multiple Access
CPTR: Common Periodic Time Reference
DDR: Double Data Rate
DL: Downlink
EVM: Error Vector Magnitude
FFT: Fast Fourier Transform
FPGA: Field Programmable Gate Array
GSM: Global System for Mobile Communications
LTE: Long Term Evolution
MIMO: Multiple Input Multiple Output
MRT: Maximum Radio Transmission
OFDM: Orthogonal Frequency-Division Multiplexing
PER: Packet Error Rate
PCIe: Peripheral Component Interconnect Express
PLMN: Public Land Mobile Network
PXIe: PCI eXtensions for Instrumentation Express
RAT: Radio Access Technology
RF: Radio Frequency
RX: Receive
SDR: Software Defined Radio
SRP: Software Radio Peripheral
TX: Transmit
UE: User Equipment
UL: Uplink
UMTS: Universal Mobile Telecommunications System
WCDMA: Wideband Code Division Multiple Access
ZF: Zero Forcing

TERMS

The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), personal communication device, smart phone, television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, PDAs, portable Internet devices, music players, data storage devices, other handheld devices, as well as wearable devices such as wrist-watches, headphones, pendants, earpieces, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

MIMO Example and Theory

FIG. 1 shows an exemplary MIMO system 100 that includes base station 102 and M mobile devices 106A-M (which may also be referred to as user equipment devices or UEs 106A-M). In the illustrated embodiment, base station 102 includes N antennas configured to transmit and receive data with mobile devices 106 using time-division duplexing (TDD). In other embodiments, other transmission techniques may be used including frequency-division duplexing (FDD), for example.

In system 100, mobile devices 106 may concurrently communicate with base station 102 via wireless propagation environment. The paths taken by different signals may vary among the mobile devices, e.g., based on their location in the environment. Therefore, using MIMO techniques to precode signals transmitted by the base station, for example, may greatly improve overall radio capacity, performance, and/or range. Thus, base station 102 may allocate multiple antennas (e.g., as many as ten or more in some massive MIMO systems) to a given mobile device 10. To configure allocation, in some embodiments, mobile devices may concurrently transmit a known pattern to the base station in a particular time or frequency slot. Base station 102 may compare the pattern across a number of antennas to determine the unique channel characteristics to each spatially diverse path for the different UEs. Subsequently, the base station may apply the inverse of channel characteristic parameters as a form of precoding, such that each mobile device 106 receives its intended messages.

In some embodiments, base station 102 is configured to exploit the reciprocity of the channel between base station 102 and a given mobile device 106 by using uplink channel conditions (for communications from one or more of the mobile devices 106 to the base station 102) to configure downlink transmissions (from the base station 102 to at least one of the mobile devices 106). Received downlink and uplink signals, y and z, may be modeled as:

$$y=Hd+w \qquad (1)$$

$$z=Gu+v \qquad (2)$$

where d and u represent transmitted downlink and uplink signals respectively, H represents a complex-valued downlink channel matrix of M×N dimensions, G represents a complex-valued uplink channel matrix of N×M dimensions, and x and v represent additive noise that is independent on each signal path.

If the transition from uplink to downlink is sufficiently fast (e.g., within the channel coherence time), G approaches the conjugate transpose of H, H*. This concept is referred to as channel reciprocity. Techniques for facilitating performance of the transition from uplink to downlink within the coherence time are discussed below with reference to FIGS. 11-13.

Various options are available for precoding the downlink signal (d). For example, linear precoding may generate d as:

$$d=Fx$$

Where F is a downlink precoder applied to signals $x_N$ intended for each of N users of mobile devices 106. Typically, the precoder is formed using channel estimates. Common precoders include zero forcing (ZF) and minimum mean squared error (MMSE). In some massive MIMO embodiments with a large number of antennas, the columns of H may become nearly orthogonal and maximum ratio transmission (MRT) precoding may be applied. This may simplify precoding while maintaining a maximum sum rate relative to other precoding methods. In various embodiments, however, any of various appropriate precoding techniques may be implemented.

Speaking generally, MIMO techniques may increase capacity, performance, and/or range of wireless communications. Although various embodiments are discussed herein in the context of cellular communications, these embodiments are not intended to limit the scope of the present disclosure. Rather, the disclosed techniques may be used in various wireless communication contexts, such as WIFI, for example.

FIG. 2 shows exemplary send and receive chains for reciprocity-based MIMO for two antennas, which may be included in MIMO base station 102, for example. In the illustrated embodiment, analog-to-digital (A/D) converters 212A-N demodulate and digitize received uplink signals from RF. Down-samplers 214A-N down-sample the digital samples to a desired sampling rate, e.g., that is some fraction of the A/D sampling rate. Subsequently, units 216A-N, 218A-N, 220A-N, and 222A-N perform OFDM signal processing, including removing the cyclic prefix (CP), performing a Fast Fourier Transform (FFT) after serial-to-parallel conversion, removing guard subcarriers, and de-allocating uplink data and pilots to the resource map. Base station 102 may then pass pilot and data symbols for all N receive chains to channel estimator 250.

Channel estimates generated by channel estimator 250, in the illustrated embodiment, are used by MIMO decoder 240 to decode M uplink data streams and by MIMO precoder 260 to precode M downlink data streams.

The precoded downlink data streams, in the illustrated embodiment, are then processed by units 224A-N, 226A-N, 228A-N, and 230A-N, including resource mapping, adding guard symbols, serial-to parallel conversion, performing an inverse FFT, and adding the cyclic prefix. Subsequently, units 232A-N up-convert the data from the baseband rate and digital to analog converters (D/As) 234A-N convert the result for transmission via the antennas.

Various disclosed techniques address challenges when adding a large number of receive and transmit chains to a system, as in massive MIMO. In some embodiments, software defined radios are used to implement a massive MIMO system that is configurable, modular, meets I/O requirements for distributed processing, and supports real-time processing for large numbers of antennas.

Exemplary Massive MIMO System

Figure 3:
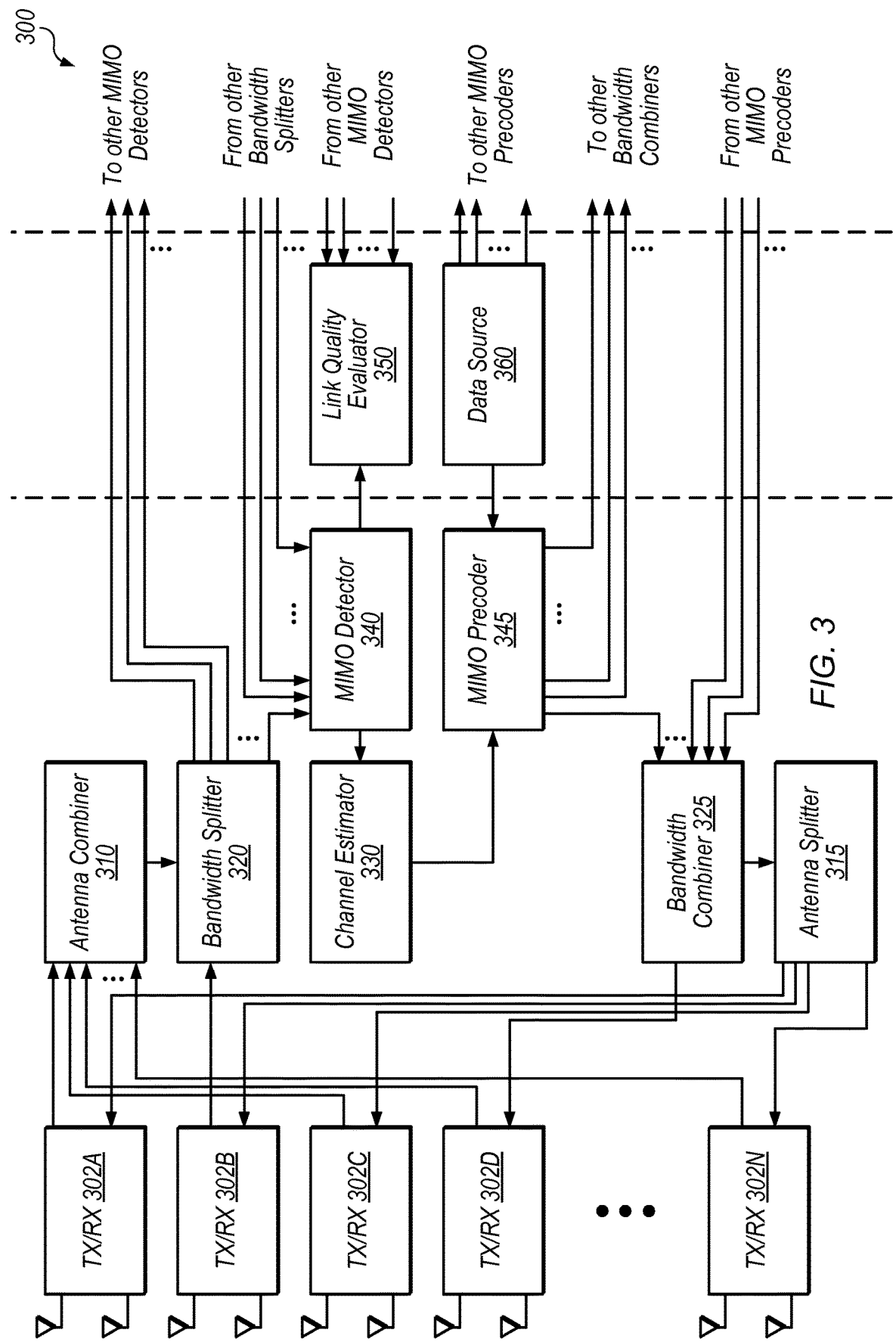
FIG. 3 is a block diagram illustrating a portion of an exemplary massive MIMO system configured to distribute processing, according to some embodiments.

FIG. 3 is a block diagram illustrating a subsystem of one embodiment of a massive MIMO system 300. System 300 may be included in base station 102, for example. In some embodiments, system 300 is configured to perform at least a portion of the processing described above with reference to FIG. 2 in a distributed manner. In the illustrated embodiment, the subsystem includes front-end TX/RX units 302A-N, antenna combiner 310, antenna splitter 315, bandwidth splitter 320, bandwidth combiner 325, channel estimator 330, MIMO detector 340, and MIMO precoder 345. In the illustrated embodiment, link quality evaluator 350 and data source 360 are included in a central control unit that is shared among multiple subsystems (as indicated by the vertical dashed lines, delineating units included in the central controller, according to this embodiment).

Other subsystems of system 300 (not shown), in the illustrated embodiment, include additional MIMO detectors, MIMO precoders, bandwidth splitters, and bandwidth combiners. For example, in an embodiment in which the subsystem of FIG. 3 includes eight TX/RXs 302 and the system includes six subsystems, 96 antennas may be used. MIMO processing, in the illustrated embodiment, is distributed among various processing elements. This may allow baseband processing to be partitioned across multiple FPGAs, for example. This may facilitate scaling of massive MIMO systems far beyond what a single centralized processing unit could achieve for real-time baseband processing.

TX/RX units 302A-N, in some embodiments, are included in software defined radio modules, which may also include processing elements configured or configurable to perform the functionality of various other units shown in FIG. 3. For example, TX/RX 302A and antenna combiner 310 may be implemented by the same SDR element. An exemplary embodiment of a peripheral configured to implement an SDR is discussed in further detail below with reference to FIG. 4.

For uplink symbols, as previously discussed with reference to FIG. 2, each TX/RX 302 may be configured to digitize the received RF signals, perform analog front-end calibration and time/frequency synchronization, remove the cyclic prefix (CP), and perform FFT OFDM demodulation and guard-band removal. This may result in frequency domain pilot and unequalized data symbol vectors, which is provided to antenna combiner 310 in the illustrated embodiment. Note that, at this point, the OFDM symbols may contain the superposition of transmitted signals by all users. For downlink symbols, each TX/RX 302 may be configured to perform ODFM processing as described above with reference to FIG. 2 for signals received from antenna splitter 315.

In one embodiment, antenna combiner 310, bandwidth, splitter 320, MIMO precoder 345, bandwidth combiner 325, and antenna splitter 315 are each located on a different SDR element that also implements one of TX/RXs 302. In one embodiment, channel estimator 330 and MIMO detector 340 are located on another SDR element that also implements one of TX/RXs 302. In various embodiments, the various elements of FIG. 3 may be partitioned among various hardware elements configured to perform the disclosed functionality. The hardware elements may be programmable and/or include dedicated circuitry.

Antenna combiner 310, in the illustrated embodiment, is configured to receive the yet unequalized OFDM symbols from each TX/RX 302 and combines them into a signal sent to bandwidth splitter 320. This combines the signals from up to N antennas in the subsystem. Combining this information before further processing may allow the system to stay within throughput constraints and may reduce the number of peer-to-peer connections between SDRs, for example. In some embodiments, the number of antennas for which signals are combined by each antenna combiner 310 is dynamically configurable.

Bandwidth splitter 320, in the illustrated embodiment, is configured to split the received signals into separate bandwidth portions and send the portions to MIMO detectors in different subsystems. Thus, in the illustrated embodiment, processing is distributed across different processing elements that each process data for a different frequency band. Each bandwidth portion may include one or more subcarriers and the portions may or may not be non-overlapping. In some embodiments, the number of bandwidth portions and the size of each portion is configurable, e.g., based on the number of antennas, current number of users in communication, etc. In other embodiments, processing may be distributed among processing elements across different time slices in addition to and/or in place of splitting by frequency. In some embodiments, bandwidth splitter 320 is replaced with a time-slice splitter. Post-FTT subcarrier processing in OFDM may be inherently independent, allowing subsequent processing to be performed in parallel by different processing elements.

In the illustrated embodiment, the output of TX/RX 302B is provided directly to bandwidth splitter 320 and an output of bandwidth combiner 325 is provided directly to TX/RX

302D. In other embodiments, these outputs may be provided to antenna combiner 310 and antenna splitter 315 similarly to the other signals. In embodiments in which TX/RX 302B and bandwidth splitter 320 share the same SDR element and TX/RX 302D and bandwidth combiner 325 share the same SDR element, however, the illustrated coupling may conserve I/O resources.

MIMO detector 340, in the illustrated embodiment, is configured to use an estimated channel matrix (e.g., based on uplink pilot symbols) to cancel interference and detect frequency-domain symbols from each mobile device 106. As shown, in some embodiments MIMO detector 340 is configured to process signals in a given bandwidth from multiple subsystems of system 300. In the illustrated embodiment, MIMO detector 340 is configured to send the detected signals to channel estimator 330 and to link quality evaluator 350 (included in a central controller in some embodiments) for further processing.

Channel estimator 330, in the illustrated embodiment, is configured to perform channel estimation for its frequency portion for a number of mobile devices, e.g., to produce soft-bits (also referred to as log-likelihood ratios (LLRs)) and provide them to link quality evaluator 350 (coupling not shown). In some embodiments, multiple decoders are implemented, including a turbo decoder, for example.

For downlink symbols, data source 360, in test system embodiments, is configured to generate test data, which may be pseudo-random or may be explicitly specified for a particular test. In these embodiments, data source 360 may be located in a central control unit. In production systems, data source 360 may provide data from various networks to be transmitted to mobile devices 106.

MIMO precoder 345, in the illustrated embodiment, is configured to receive downlink data from data source 360 and precode the data based on channel estimates (e.g., estimated reciprocity calibration weights) from channel estimator 330. In some embodiments, the MIMO precoders in system 300 are configured to perform precoding on different frequency portions of the downlink data. In some embodiments (not shown), the MIMO precoders in system 300 are configured to perform precoding on different time portions of the downlink data.

Exemplary precoders, according to some embodiments, include maximum radio transmission (MRT) and zero forcing (ZF) precoders. In other embodiments, any of various appropriate precoding techniques may be implemented. Depending on the precoding technique implemented, varying amounts of processing for the precoding may be performed by at a central controller or distributed among MIMO precoders 345.

Bandwidth combiner 325, in the illustrated embodiment, is configured to combine signals at different bandwidths from multiple MIMO precoders and send the data to antenna splitter 315. This may result in a complete set of precoded data for transmission from the separately processed bandwidth portions. In other embodiments, bandwidth combiner 325 is configured to combine data corresponding to separately-processed time slices in place of or in addition to combining separately-processed frequency portions.

Antenna splitter 315, in the illustrated embodiment, is configured to split the received signal and provide the split signal to TX/RXs 302 for OFDM processing and transmission to mobile devices 106. The set of antennas to which antenna splitter 315 is configured to provide signals is dynamically configurable, in some embodiments (e.g., the number of antennas and/or the particular antennas in the set). Thus, in some embodiments, the set of processing elements configured to perform distributed processing for particular antennas and/or users is dynamically configurable.

Link quality evaluator 350, in the illustrated embodiment, is included in a central control unit and is configured to measure link quality using one or more of various metrics such as bit error rate (BER), error vector magnitude (EVM), and/or packet-error rate (PER).

In various embodiments, system 300 is highly configurable, e.g., based on user input and/or current operating conditions. In some embodiments, various disclosed configuration operations are performed automatically. In some embodiments, the number of processing elements used at a given time to perform distributed processing for a set of users or a set of antennas is configurable. In some embodiments, the number of antennas used to communicate with each UE is configurable and/or dynamically determined. In some embodiments, the processing elements configured to perform different functionality described above is configurable. For example, the antenna combiner function may be moved from one FPGA to another FPGA or performed by multiple FPGAs. In some embodiments, the routing of data between processing elements is configurable, e.g., to avoid malfunctioning antennas and/or processing elements. In various embodiments, system 300 is configured to adjust these configurable aspects dynamically based on current operating conditions. In some embodiments, system 300 includes a large number of antennas, e.g., more than 8. In some embodiments, for example, system 300 includes 16, 32, 64, 100, 128, 256, or more antennas. In some embodiments, components of system 300 are modular such that the number of antennas may be increased by adding additional components.

In some embodiments, a software library is provided with system 300 and is configured with example test scenarios for configuring system 300. In some embodiments, a graphical programming language such as LabVIEW is used to configure programmable hardware devices in system 300. Thus, various functionality described herein may be configured using a graphical programming interface.

Exemplary high-level system parameters, according to some embodiments, include a system bandwidth of 20 MHz, a carrier frequency of 3.7 GHz, a sampling rate of 30.72 MS/s, and FFT size of 2048, 1200 used subcarriers, a 0.5 ms slot time, a 1 ms subframe time, a 10 ms frame time, and 100 antennas. These parameters are exemplary only and are not intended to limit the scope of the present disclosure. In some embodiments, the parameters are user configurable and/or are dynamically configurable by the system itself In the illustrated embodiment, bandwidth splitter 320 is configured to separate and provide bandwidth portions of the incoming signals from multiple antennas in order to distribute processing load. In other embodiments, the incoming signals maybe split in other dimensions in addition to and/or in place of the frequency dimension. Processing for downlink signals may be similarly distributed. Thus, in various embodiments, the disclosed system is highly configurable and provides high-performance distributed processing to meet real-time performance requirements for massive MIMO systems.

Exemplary Software Defined Radios

Figure 4:
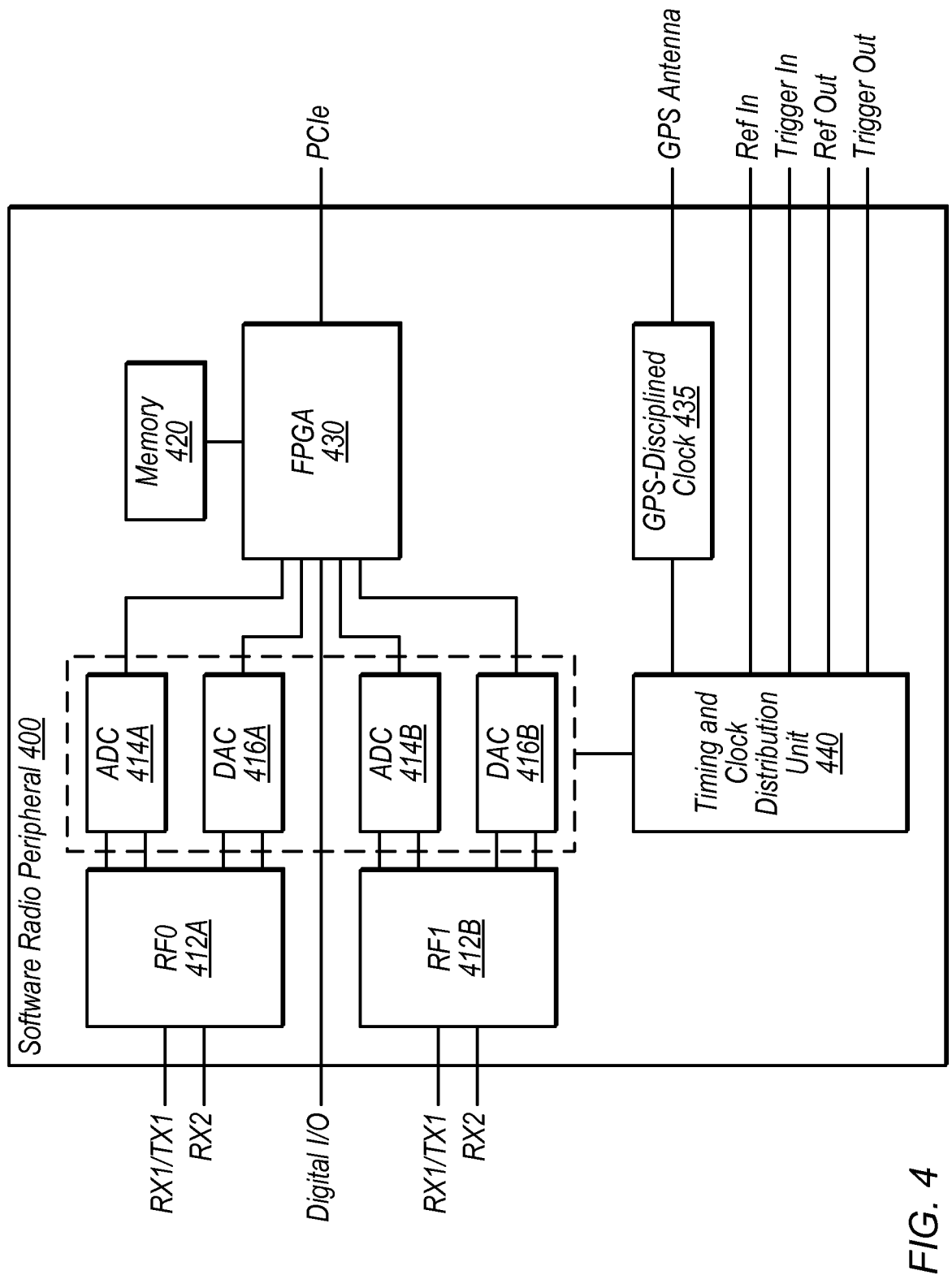
FIG. 4 is a block diagram illustrating an exemplary software radio peripheral, according to some embodiments.

FIG. 4 shows one embodiment of a software radio peripheral 400. The National Instruments® Universal Software Radio Peripheral (USRP) is one exemplary embodiment of a software radio peripheral 400. In some embodiments, a software radio peripheral 400 is configured to implement one or more of TX/RXs 302 and one or more of antenna combiner 310, bandwidth splitter 320, channel estimator 330, MIMO detector 340, MIMO precoder 345, bandwidth combiner 325, and antenna splitter 315 of FIG. 3. In some embodiments, multiple software radio peripherals 400 are coupled via one or more interconnects to implement a massive MIMO base station.

Software radio peripheral 400, in the illustrated embodiment, includes radio frequency transceivers RF0 412A and RF1 412B, ADCs 414A-B, DACs 416A-B, memory 420, field-programmable gate array (FPGA) 430, timing and clock distribution unit 440, and GPS-disciplined clock 435.

RF transceivers RF0 412A and RF1 412B, in the illustrated embodiment, are configured to send and receive transmissions to one or more mobile devices 106 via one or more antennas. In one embodiment, each transceiver is configured to utilize up to 40 MHz of radio frequency bandwidth at center frequencies of 1.2-6 GHz and is configured to transmit with up to 15 decibel-milliwatts (dBm).

ADCs 414A-B and DACs 416A-B may be configured similarly to A/D 212A-N and D/A 234A-N as described above with reference to FIG. 2. In some embodiments, these elements are respectively configured to convert received analog data to digital form and received digital information to analog form for wireless transmission.

FPGA 430, in some embodiments, is a programmable hardware element configured to and/or configurable to perform various radio processing functionality. In some embodiments, FPGA 430 is configured to perform various MIMO processing described above with reference to FIG. 3. For example, FPGA 430 may be configured to perform one or more of OFDM front-end processing (e.g., as discussed with reference to units 214, 216, 218, 220, 222, 224, 226, 228, 230, and 232 of FIG. 2), antenna combining, bandwidth splitting, MIMO detection, channel estimation, MIMO precoding, bandwidth combining, antenna splitting, etc. In the illustrated embodiment, FPGA 430 is coupled to ADCs 414A-B and DACs 416A-B, a digital I/O port, and a Peripheral Component Interconnect Express (PCIe) connection. In some embodiments, software radio peripheral 400 is coupled to other software radio peripherals and/or a central control unit via PCIe (or any of various other appropriate couplings).

With reference to various operations disclosed herein, a program may described as capable of causing or configuring a computing system to perform various operations. This encompasses both instructions that are executable by the computing system to cause the system to perform the operation(s) and instructions that are usable to configure the computing system (e.g., by configuring FPGA 430) such that it is capable of performing the operation(s) (note that the latter type of instructions may not be executed, but may be used to configure programmable circuitry, for example, which is then configured to perform the operation(s)).

In other embodiments, FPGA 430 may be replaced or supplemented with any of various appropriate processing elements. Inclusion of a programmable hardware element in software radio peripheral 400 in some embodiments, however, may increase configurability and flexibility of the system. In test systems, for example, test engineers may modify the configuration of FPGA 430 to develop and test different MIMO software radio processing techniques. In production systems, programmable hardware elements may facilitate system reconfiguration and/or updates in various contexts.

Memory 420, in some embodiments, is configured to facilitate programming of FPGA 430 and/or storing of values (e.g., sampled and processed uplink signals) during processing operations by FPGA 430. Memory 420 may include multiple different storage elements or a single storage element and may be implemented using various different memory technologies as appropriate.

Timing and clock distribution unit 440, in the illustrated embodiment, is configured to receive information from GPS-disciplined clock 435, a reference signal input "ref in," and/or a trigger input signal. In the illustrated embodiment, unit 440 is also configured to provide a reference output signal "ref out" and a trigger output signal. In some embodiments, described in further detail below with reference to FIGS. 7-10, one or more of these signals may be used to synchronize sampling and/or other operations by multiple software radio peripherals.

GPS-disciplined clock 435, in the illustrated embodiment, is configured to receive global positioning system (GPS) signals and generate a clock signal for timing and clock distribution unit 440 that is disciplined to a GPS time. GPS is provided as one example of a reference clock, but in other embodiments, any of various appropriate reference clocks may be used, including clocks generated by satellite navigation systems other than GPS, etc. In some embodiments, the reference signal input may be configured to receive a reference clock signal and the GPS-disciplined clock 435 is omitted, disabled, or ignored.

Software radio peripheral 400 is provided as one example of a hardware module configured or configurable to implement a portion of the functionality of system 300. In other embodiments, other processing elements such as a central processing unit or a non-FPGA programmable hardware element in addition to or in place of an FPGA may be used to perform similar operations. Further, although unit 400 is referred to as a "software" radio peripheral 400 in disclosed embodiments, it may also be a hardwired radio peripheral configured to perform similar functionality. In some embodiments, software radio peripheral 400 is a plug-in module or card configured to be inserted into a chassis (such as a PCIe chassis for example) for communication with other modules. In other embodiments, processing elements configured to perform similar functionality may be integrated or coupled into a massive MIMO system using other techniques.

Software radio peripheral 400 is provided as one example of a hardware module configured to implement functionality of system 300. In other embodiments, other processing elements such as processors or other programmable hardware elements in addition to or in place of an FPGA may be used to perform similar operations. Further, although unit 400 is referred to as a "software" radio peripheral 400 in disclosed embodiments, it may also be a hardwired radio peripheral configured to perform similar functionality. In some embodiments, software radio peripheral 400 is a plug-in module or card configured to be inserted into a chassis (such as a PCIe chassis for example) for communication with other modules. In other embodiments, processing elements configured to perform similar functionality may be integrated or coupled into a massive MIMO system using other techniques.

Exemplary System Interfaces

In some embodiments, the disclosed massive MIMO system performs within practical hardware I/O limits while providing a low-latency path for time-critical processing. In some embodiments, the critical signal path is from receipt of OFDM symbols through channel estimation, MIMO precoding, and OFDM transmission. This path may be especially important for reciprocity-based MIMO. In some embodiments, this path includes RX front-end delay, CP removal, FFT, guard subcarrier removal, channel estimation, precoder calculation, guard subcarrier interleave, IFFT, CP addition, and TX front-end delay. Additional sources of latency may include overhead in data routing, packing, unpacking, and hops across the PCIe backplane. In disclosed embodiments this latency is reduced by using efficient routing mechanisms over a high speed communication bus (such as PCIe, for example). Further, a high degree of pipelining (which may be enabled by packing data antennas-first) and the disclosed combining data from multiple antennas and then splitting it based on bandwidth before distributing the data for processing, as shown in FIG. 3, allows the number of antennas and the overall system bandwidth to be scaled upwards almost indefinitely. Pipelining, in various embodiments, may allow different sets of data (e.g., data sampled from the antennas at different times) to reside in different processing stages. For example, one FPGA may perform bandwidth splitting, then pass the data on to another FPGA for MIMO detection before splitting a subsequent set of data, in a pipelined fashion. Referring back to FIG. 3, various units may be configured to operate in a pipelined and distributed manner.

Figure 5:
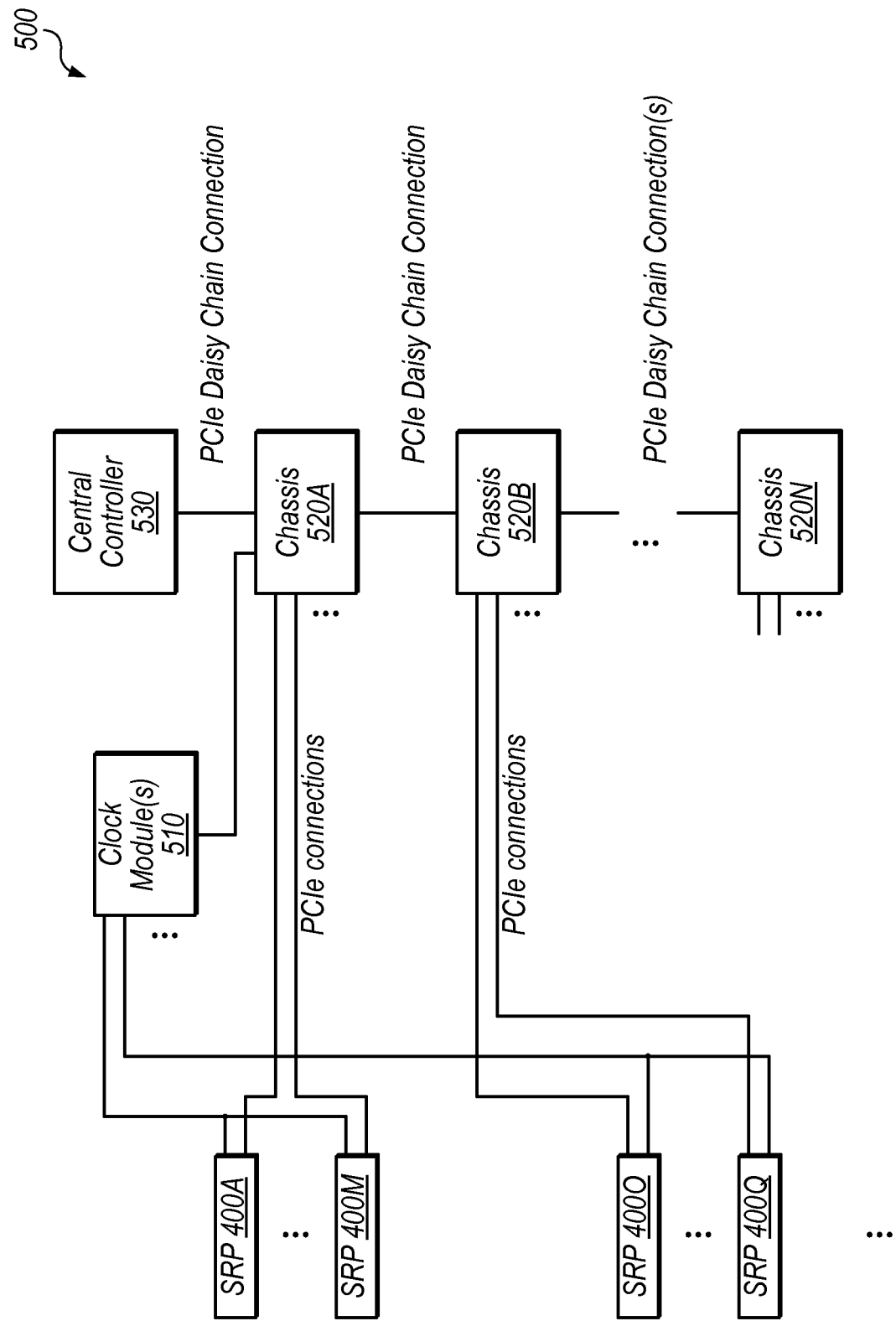
FIG. 5 is a block diagram illustrating a hardware system configured to implement a massive MIMO base station, according to some embodiments.

FIG. 5 shows one embodiment of a system 500 that includes hardware configured to implement a massive MIMO base station. In the illustrated embodiment, system 500 includes clock module(s) 510, chassis 520A-N, SRPs 400A-Q, and central controller 530.

Clock module(s) 510 are configured to distribute clock and/or trigger signals, in some embodiments, e.g., to the reference and/or trigger terminals of each SRP. An exemplary clock/trigger distribution system is described below with reference to FIG. 7.

In one embodiment, each SRP 400 is included in or coupled to a chassis 520 and is configured to handle up to 800 MB/s bidirectional via a PCI eXtensions for Instrumentation Express (PXIe) backplane. In other embodiments, any of various appropriate backplane protocols may be implemented.

Chassis 520, in the illustrated embodiment, are configured to include or couple to multiple SRPs 400 via PCIe connections. In some embodiments, each chassis 520 includes one or more switches configured to route communications. In one embodiment, each chassis 520 includes two switches. Each switch may be configured to stream up to 3.2 GB/s of bidirectional traffic for each slot in the chassis, with a total of 12 GB/s shared between devices on the switch, for example. In the illustrated embodiment, the chassis 520 are coupled via a PCIe daisy chain connection. In some embodiments, daisy chain connections in a star configurations may be used to build higher channel-count systems. In one embodiment, the daisy-chain cables between chassis are configured to stream up to 5.6 GB/s unidirectional or 2.8 GB/s bidirectional. In other embodiments, any of various appropriate communications protocols may be implemented. The bandwidths discussed above are exemplary only, and are not intended to limit the scope of the present disclosure. They illustrate, however, that the disclosed distributed processing results in a scalable system configured to operate within bandwidth constraints of various components.

Central controller 530, in some embodiments, is configured to implement the functionality of link quality evaluator 350 and data source 360. In some embodiments, central controller 530 provides a user interface for radio configuration, deployment of FPGA configuration code, system visualization etc. In some embodiments, central controller 530 is configured to source and sink user data, e.g., with other networks with as the Internet. In some embodiments, central controller 350 is configured to measure link quality using metrics such as bit error rate (BER), packet error rate (PER), and/or error vector magnitude (EVM), for example.

In one embodiment, five types of FPGA images are used to configure the SRPs 400 of system 500. In this embodiment, the first type is OFDM TX/RX only, used to implement one or more front-end TX/RXs 302. In some embodiments, this type may be allocated among available processing elements after allocation of the four other types. In this embodiment, the second type is OFDM TX/RX with antenna combiner and bandwidth splitter. In some embodiments, this type is spread evenly across chassis segments, e.g., with one per PXI switch segment. In one embodiments, each FPGA of this type is associated, at least initially, with sixteen antennas. In these embodiments, the third type is OFDM TX/RX with MIMO detector. In some embodiments, the MIMO detector may output channel estimates and/or LLR outputs. In these embodiments, the fourth type is OFDM TX/RX with MIMO precoder, which may output precoded data bits. In these embodiments, the fifth type is OFDM TX/RX with bandwidth combiner and antenna splitter, which may distributed similarly to the second type, as discussed above. In other embodiments, processing may be distributed among various types of processing elements (e.g., in addition to and/or in place of FPGAs) using any of various appropriate distributions.

Figure 6:
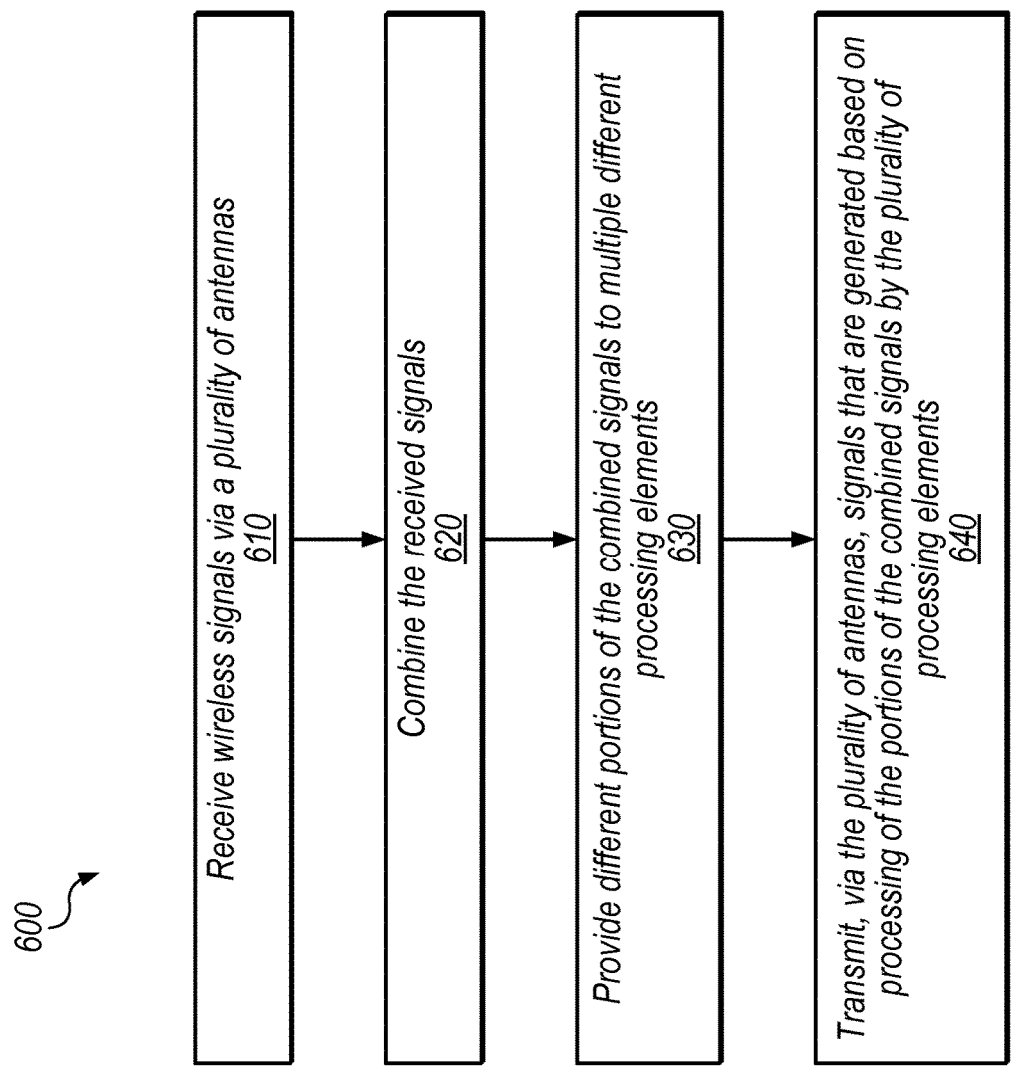
FIG. 6 is a flow diagram illustrating a method for MIMO processing according to some embodiments.

FIG. 6 shows a flow diagram illustrating one exemplary embodiment of a method 600 for massive MIMO processing. The method shown in FIG. 6 may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired. Flow begins at 610.

At 610, wireless signals are received via a plurality of antennas. For example, the illustrated subsystem of FIG. 3 may receive wireless signals via the 2N antennas coupled to TX/RXs 302A-N. In some embodiments the signals are OFDM signals, but in other embodiments, other modulation schemes may be implemented.

At 620, the received signals are combined. In some embodiments, antenna combiner 310 is configured to combine the signals. The signals combined may be from all antennas in a given massive MIMO system or for a portion of the antennas in a massive MIMO system (e.g., for the subsystem shown in FIG. 3 or for a portion thereof). The combined signals may include information from multiple different users.

At 630, different portions of the combined signals are provided to different processing elements. In some embodiments, the different portions are mutually exclusive (e.g., the information provided to a given processing element is not provided to other processing elements). In other embodiments, there may be some overlap between the information provided to the different processing elements. In some embodiments, bandwidth splitter 320 is configured to provide frequency portions of the combined signals to different software radio peripherals 400. In some embodiments, one or more processing elements are configured to split the combined signals into different time slices and provide the time slices to different software radio peripherals 400. In some embodiments, the combined signals are split in both the time and frequency dimension to further distribute processing.

At 640, signals are transmitted via the plurality of antennas. In the illustrated embodiment, the signals are generated based on processing of the portions of the combined signals by the plurality of processing elements. For example, the processing may generate channel information used to precode the transmitted signals for massive MIMO communications. The distributed nature of the processing may allow system 300 to operate in real time and provide reciprocity-based precoding before the channel changes significantly.

In some embodiments, each processing element is configured to operate on a different frequency portion of signals received by multiple antennas. In some embodiments, each processing element is configured to operate on a different time portions of signal received by multiple antennas. In some embodiments, the number of processing elements in the subset is dynamically configurable based on current communication conditions. In some embodiments, the operating includes detecting one or more uplink pilot symbols and generated channel information based on the pilot symbols. In some embodiments, similar techniques are used for distributed processing for precoding downlink data then combining the different portions for transmission via multiple antennas.

Further, the disclosed techniques may facilitate dynamic configurability of the massive MIMO base station. For example, if elements of system 300 are malfunctioning or otherwise unavailable, system 300 is configured, in some embodiments, to alter the set of software radio peripherals assigned to a given set of antennas to route around the unavailable elements. In some embodiments, the number of processing elements assigned to a given set of antennas at a given time is also configurable. For example, the size of the bandwidth and/or time portions processed by each processing element is also configurable, in some embodiments. Further, the number of antennas used for a given user device may also be dynamically configurable. Various dynamic configuration may be performed by system 300 in response to current operations conditions, e.g., power conditions, the state of the wireless communication environment, number of user devices in communication, etc.

Exemplary Synchronization System

Figure 7:
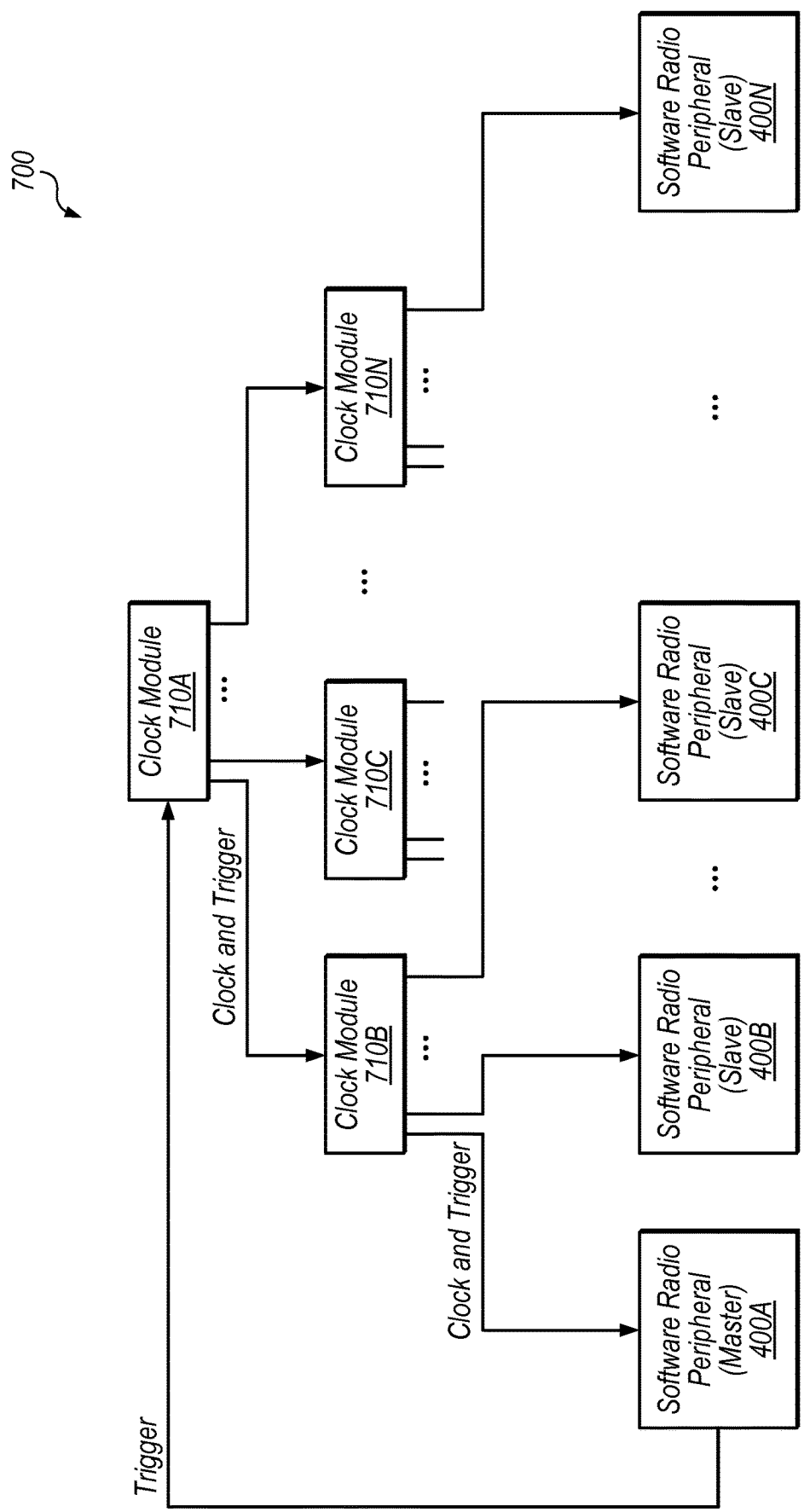
FIG. 7 is a block diagram illustrating one embodiment of a clock and trigger distribution network for synchronization, according to some embodiments.

FIG. 7 shows a block diagram illustrating one embodiment of a clock and trigger distribution system 700. In the illustrated embodiment, system 700 includes clock modules 710A-N which are configured to provide clock and trigger signals to SRPs 400A-N. In the illustrated embodiment the SRPs 400 include a master SRP 400A and multiple slave SRPs 400B-N. In some embodiments, low skew buffering circuitry and matched-length transmission cables are used to reduce skew between the reference clock inputs and trigger inputs at each SRP. In some embodiments of system 700, reference clock skew is less than 100 picoseconds and trigger skew is less than 1.5 nanoseconds.

Clock modules 710, in the illustrated embodiment, are arranged in a hierarchical tree structure with clock module 710A at the root. Each clock module 710, in the illustrated embodiment, is configured to receive or generate a clock signal and a trigger signal and provide the clock signal and the trigger signal to multiple other elements. This configuration may allow the system 700 to be scaled to synchronize massive MIMO systems with various numbers of SRPs 400. Although two levels are shown in the illustrated embodiments, in other embodiments, the hierarchical structure may include greater or smaller numbers of levels of clock modules (e.g., 1, 3, 4, etc.).

Master SRP 400A, in the illustrated embodiment, may trigger a sample (e.g., of uplink data) by asserting the trigger line to clock module 710A. The trigger may propagate through clock modules 710A to each SRP 400, which may perform various operations such as sampling based on the trigger. In the illustrated embodiment, the master device also receives the trigger. In the illustrated embodiment, the master device is an SRP, but in other embodiments the master device may be any appropriate processing element such as the central controller 530, etc.

Figure 8A:
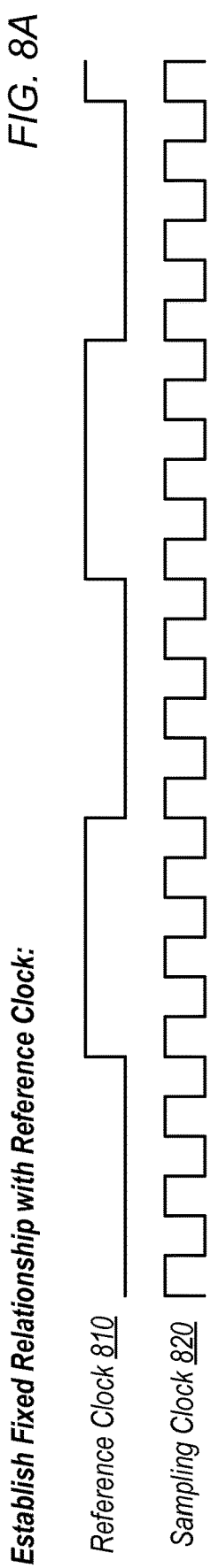

FIGS. 8A-9 illustrate exemplary timing diagrams for synchronizing an event across multiple devices according to some embodiments. FIG. 8A shows the reference clock 810 and a sampling clock 820 of one of the SRPs. In the illustrated example, a fixed relationship has been established with a reference clock 810. In the illustrated example, sampling clock 820 has been phase locked to the reference clock 810. As shown, the reference clock has a lower frequency than the sampling clock. In the illustrated embodiment, sampling clock 820 is also disciplined to a particular frequency (a particular number of edges per reference clock edge). In some embodiments, timing and clock distribution unit 440 includes a phase-locked loop and/or other circuitry configured to discipline an internal sampling clock to a reference clock. In some embodiments, reference clock 810 is provided to the "ref in" input of each SRP 400.

Figure 8B:
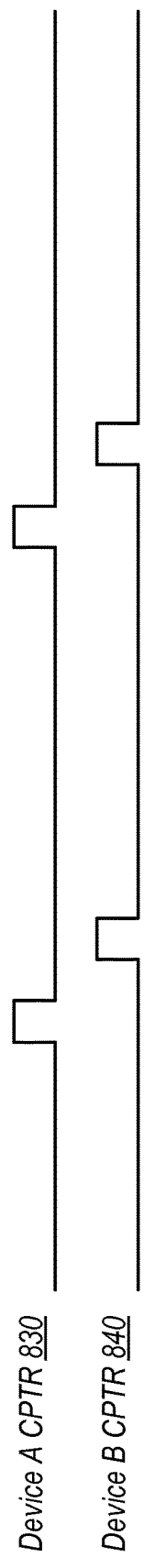
Figure 8C:
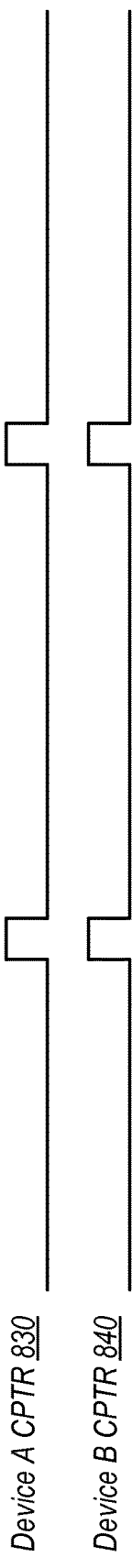

FIG. 8B-8C show alignment of common periodic time reference (CPTR) signals across multiple devices. In some embodiments, each SRP 400 is configured to generate an internal CPTR and slave SRPs 400B-400N are configured to align their CPTRs (e.g., to the CPTR of master SRP 400A or to some other point). Assuming that each device has locked its sampling clock to the same reference clock, alignment of the CPTRs may ensure that the CPTRs occur at the same sampling clock edge across all devices. In some embodiments, the CPTR is a 10 MHz signal. In the illustrated embodiment, the CPTR is high for one sample clock cycle and then low for the remainder of its period. In other embodiments, any of various appropriate waveforms may be used for CPTRs. In some embodiments, the CPTR period is configurable. In various embodiments, the CPTR period is configured to be longer than propagation delay in a synchronization system such as system 700.

In some embodiments, to synchronize the CPTRs to the same sampling clock edge, a finer granularity clock is needed than the sampling clock 820. In some embodiments, one or more of SRPs 400 are configured to utilize a clock signal at twice the frequency of sampling clock 820 and double data rate (DDR) flip flop circuitry to determine how many edges of sampling clock 820 to move each device's CPTR in order to align the CPTRs to the same sampling clock edge. In some embodiments, a start pulse is sent to each device and each device is configured to measure the difference between receipt of the start pulse and its CPTR. In some embodiments, this information is sent to central controller 530 or one of the SRPs 400, which is configured to determine how far each CPTR should be moved for alignment. This information is then sent back to the respective SRPs and used to move their respective CPTRs. As shown in FIGS. 8B-8C, two devices A and B with CPTRs 830 and 840 occurring at different times are aligned in FIG. 8C, in this example by moving the CPTR of device A two sampling clock edges.

Figure 9A:
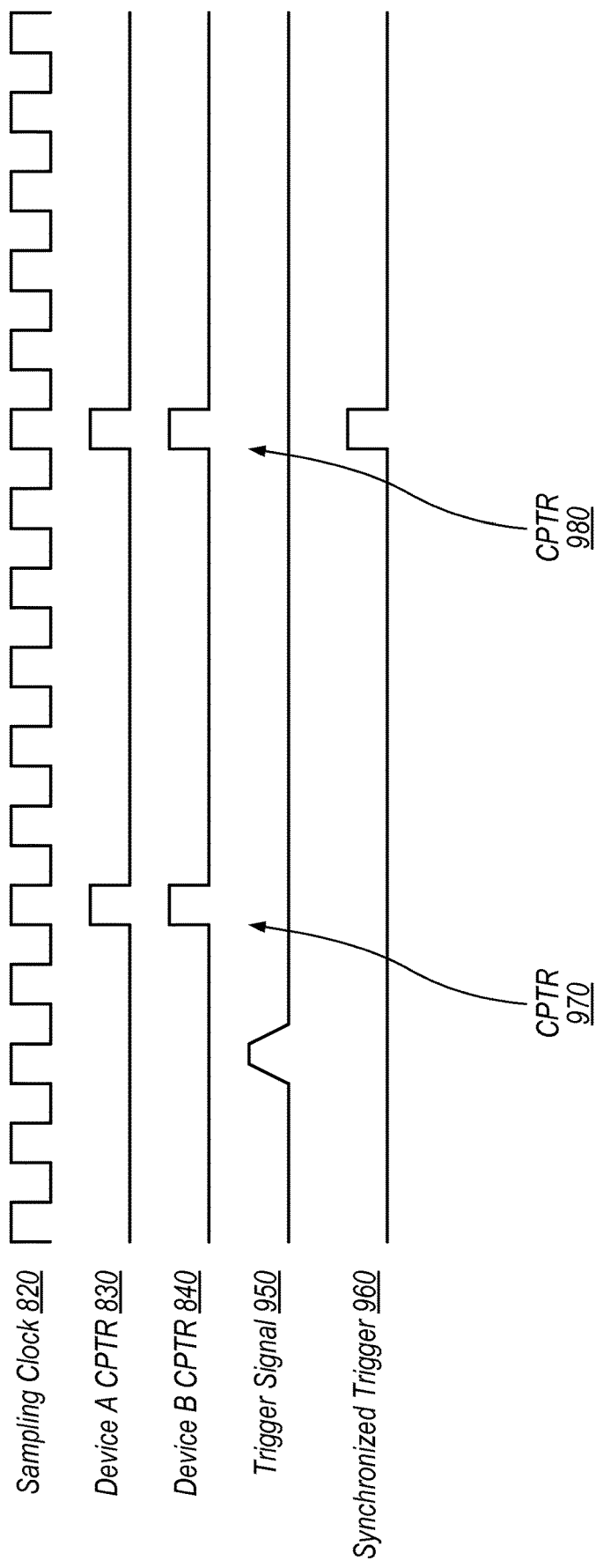

FIG. 9A shows an exemplary use of CPTRs to synchronize an event. In the illustrated embodiment, devices A and B have disciplined their sampling clocks based on a reference clock and aligned their CPTRs. A trigger signal 950 is received (e.g., at the master device) and transmitted to the synchronization system (e.g., to clock module 710A and throughout the tree) on the next CPTR edge (CPTR 970).

Based on the trigger, each device is configured to perform an operation (e.g., a sampling operation) on the subsequent CPTR 980 (illustrated by the synchronized trigger 960). In some embodiments, the triggering device is configured to record the delay between receiving the trigger and transmitting the trigger signal and/or the delay between receiving the trigger and the synchronized trigger. In some embodiments, the latter delay is between one and two CPTR periods. In embodiments in which the CPTR is longer than the propagation delay, this may ensure that all the synchronized devices can perform the event on the same sampling clock edge, even in systems in which the devices would not have received the trigger signal 950 on the same sampling clock edge. Said another way, slowing down the rate at which triggers are evaluated (using the CPTR, which is slower than the sampling clocks), repeatability is improved at the expense of some trigger latency. The illustrated synchronization may be performed across multiple processing elements, e.g., multiple SRPs or FPGAs.

Figure 9B:
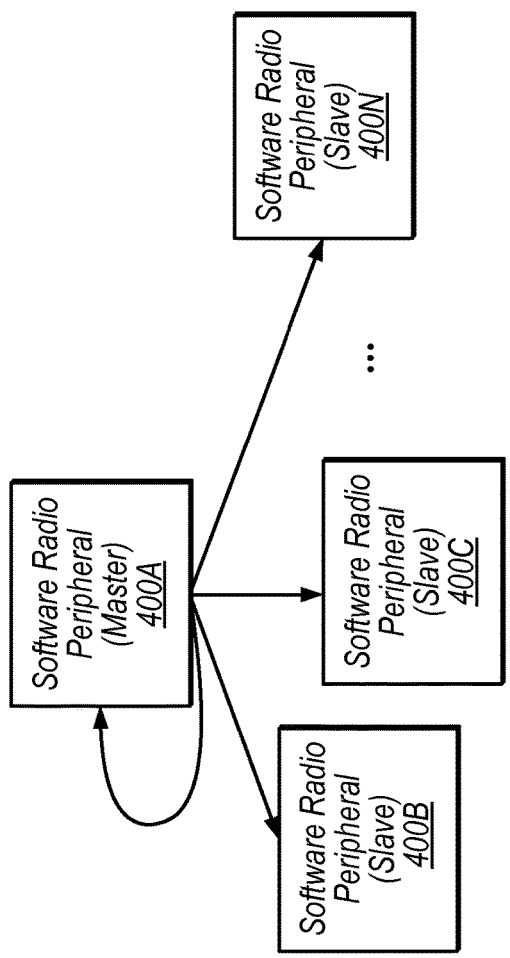
FIGS. 9B-9D are block diagrams illustrating exemplary synchronization topologies, according to some embodiments.
Figure 9C:
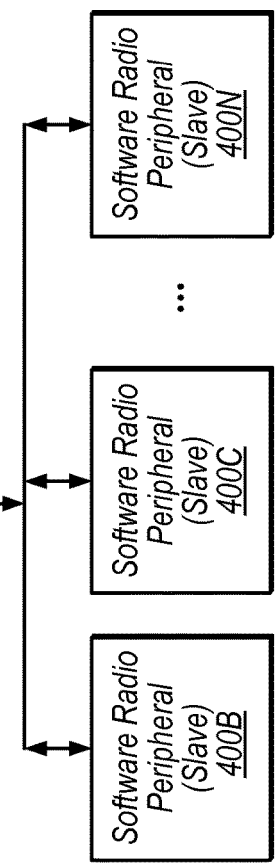
Figure 9D:
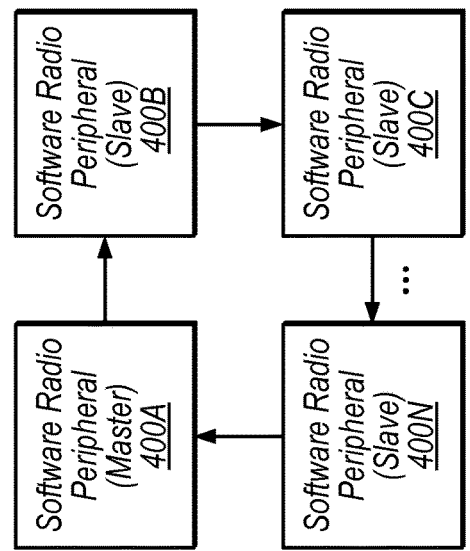

Although FIG. 7 shows a hierarchical structure, the disclosed techniques may be implemented in various different synchronization network topologies. FIG. 9B shows an exemplary star network in which the master SRP 400A is configured to transmit trigger signals to each slave (and to itself in some embodiments). Speaking generally, system 700 is one example of a star network with a hierarchical set of clock modules 710 used to transmit the triggers to the slave SRPs 400B-N. FIG. 9C shows an exemplary bus topology in which the master SRP 400A is configured to transmit trigger signals to each slave (and to itself in some embodiments) via a bus. FIG. 9D shows an exemplary ring topology in which a trigger from the master SRP 400A is forwarded along a ring of slave SRPs 400B-N (e.g., via the trigger out ports shown in FIG. 4). In some embodiments, the reference clock signal is also distributed via the ring topology. In still other embodiments, various other network topologies such as daisy chain couplings may be implemented.

In some embodiments, similar techniques are used for time-based synchronization. For example, each SRP 400 may be configured to maintain a local time and to reset or update the local time based on a trigger signal from a master device. In some embodiments, a pulse-per-second (PPS) signal is transmitted to each SRP 400 and a command is issued to each radio to set a common time on the next edge of the PPS signal, to establish a common time. The shared time may be set to an arbitrary time or a reference time, e.g., a coordinated universal time (UTC) queried from a GPS. Using time-based synchronization, commands may be issued to the SRPs 400 to perform future actions at a particular time. In some applications, trigger-based synchronization may be preferable to time-based synchronization, e.g., because of greater calibration time for time-based synchronization and latency in loading a future event, which may render immediate triggering events difficult to accomplish.

FIG. 10 shows a flow diagram illustrating one exemplary embodiment of a method 1000 for synchronization of radio circuitry. The method shown in FIG. 10 may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired. Flow begins at 1010.

At 1010, a fixed relationship is established between a reference clock and slave radios' respective local clocks. The fixed relationship may be a frequency and/or phase relationship. In some embodiments, the reference clock is at a lower frequency than the local clocks. In some embodiments the reference clock is transmitted via a clock and trigger distribution network. In some embodiments the clock and trigger distribution network is a hierarchical tree.

At 1020, a master device and the slave radios generate and align respective common periodic time reference signals (CPTRs) that have a lower frequency than the respective local clocks. In some embodiments, the master device is also a radio and is configured or specified as a master device rather than a slave device. In some embodiments, assignment of one of the radios to be the master device is configurable by a user and/or by the system (e.g., based on current operating conditions). In some embodiments, each device is configured to measure a number of local clock edges (or a number of edges of a derivation of the local clock, e.g., a 2× or greater clock) from a start signal and provide the measured information to central controller 530 and/or to the master device. In some embodiments, the master device is configured to instruct each device how many clock cycles to move its respective CPTR to achieve alignment.

At 1030 the master device transmits, based on an edge of its common periodic time reference signal, a trigger signal. In this embodiment, rather than immediately forwarding a received or determined trigger, the master device is configured to wait until its next CPTR edge to send the trigger. This may ensure that all devices can trigger on the same CPTR edge, e.g., by giving a full CPTR period for the trigger signal from the master to propagate. Otherwise, if the master were to send a trigger signal just before a CPTR edge, different slave devices might receive the signal in different CPTR periods, e.g., based on slightly different propagation delays, etc. In some embodiments, the master device transmits the trigger signal via the clock and trigger distribution network.

At 1040, the slave radios perform an action based on the trigger at a subsequent edge (subsequent to the edge on which the master device sends the trigger signal) of their respective CPTRs. In this embodiment, because the CPTRs are aligned, the action is synchronized. In some embodiments, the action is a sampling action for signals in a massive MIMO base station.

In some embodiments, the master device is configured to receive or generate a trigger indication and wait until the edge of its CPTR to transmit the trigger signal. In some embodiments, the action is a sampling action. In some embodiments, the fixed relationship includes discipline to a particular frequency and/or a phase lock. In some embodiments, the reference clock has a lower frequency than the local clocks. In some embodiments, a period of the CPTRs is configured to be greater than a propagation delay of the clock and trigger distribution system.

Exemplary Frame Structures

In some embodiments, the disclosed system is configured to utilize conventional signaling (e.g., 3GPP LTE signaling). In other embodiments, the LTE frame structure is modified or a different frame structure is used to improve massive MIMO processing, especially in the reciprocity-based systems.

Figure 11:
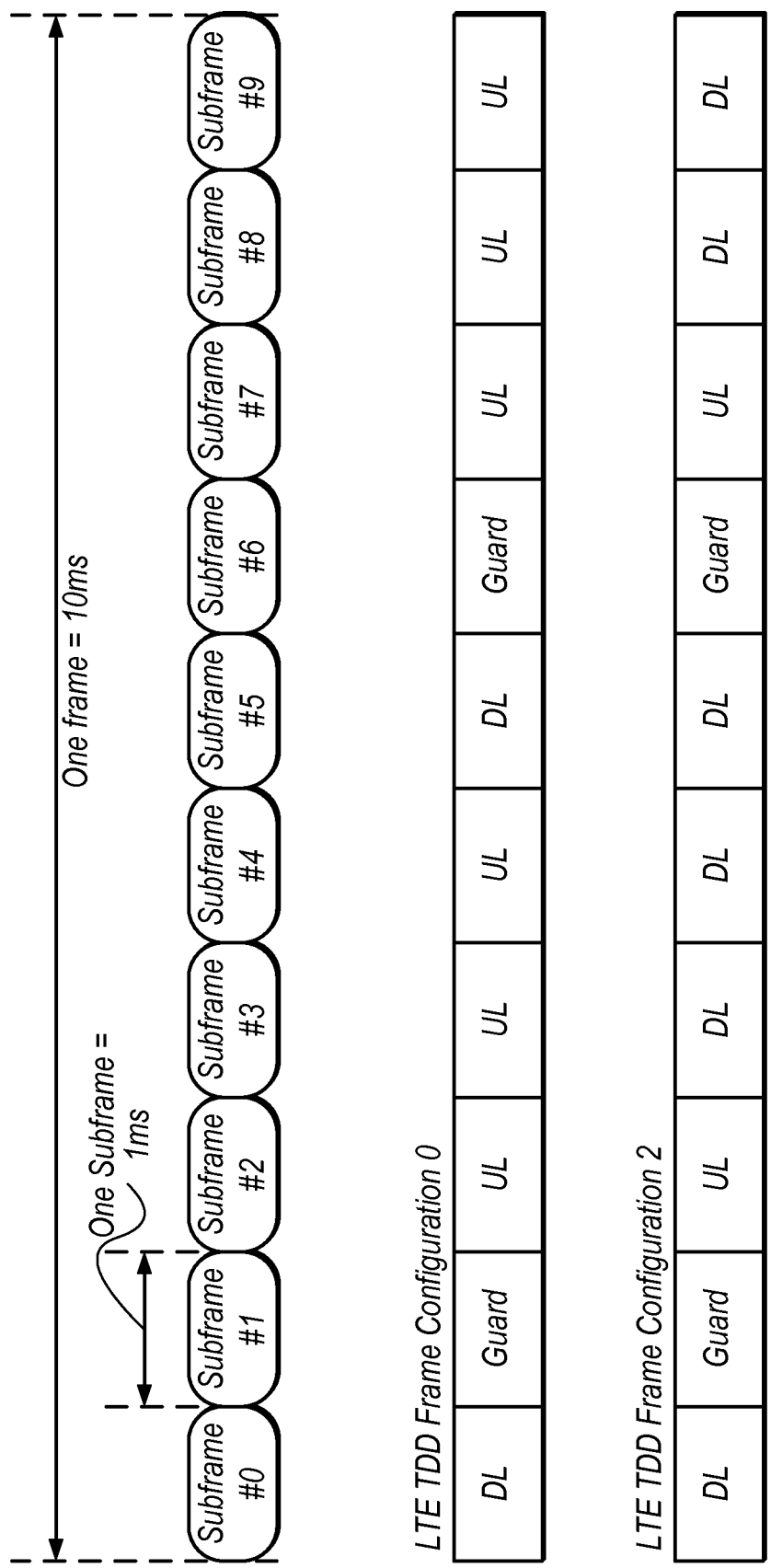
FIG. 11 is a diagram illustrating exemplary LTE TDD frame configurations, according to some embodiments.

FIG. 11 shows an exemplary LTE time division duplexing (TDD) frame. In the illustrated embodiment, the frame covers ten milliseconds (ms) in the time dimension and includes ten subframes, each covering one ms. In the illustrated embodiment, each subframe is used either for downlink (DL) data, as a guard subframe, or for uplink (UL) data. LTE TDD defines several frame configurations, two of which are shown in FIG. 11. The guard frames may include pilot time slots such as DwPTS and UpPTS.

In some embodiments, the LTE frame structure is problematic for reciprocity-based MIMO. Generally, to allow for reciprocity-based MIMO the following events must occur within the coherence time of the channel: process received samples, measure uplink channels, and precode downlink samples. In some embodiments, the turnaround time between receiving an uplink pilot symbol to transmitting a downlink symbol is specified to be less than 0.5 ms to ensure that it is less than the coherence-time, even for UEs that are moving relatively quickly. As shown in FIG. 11, this is not typically achieved using a typical LTE TDD frame, because a full 1 ms subframe is dedicated to UL or DL data.

Figure 12:
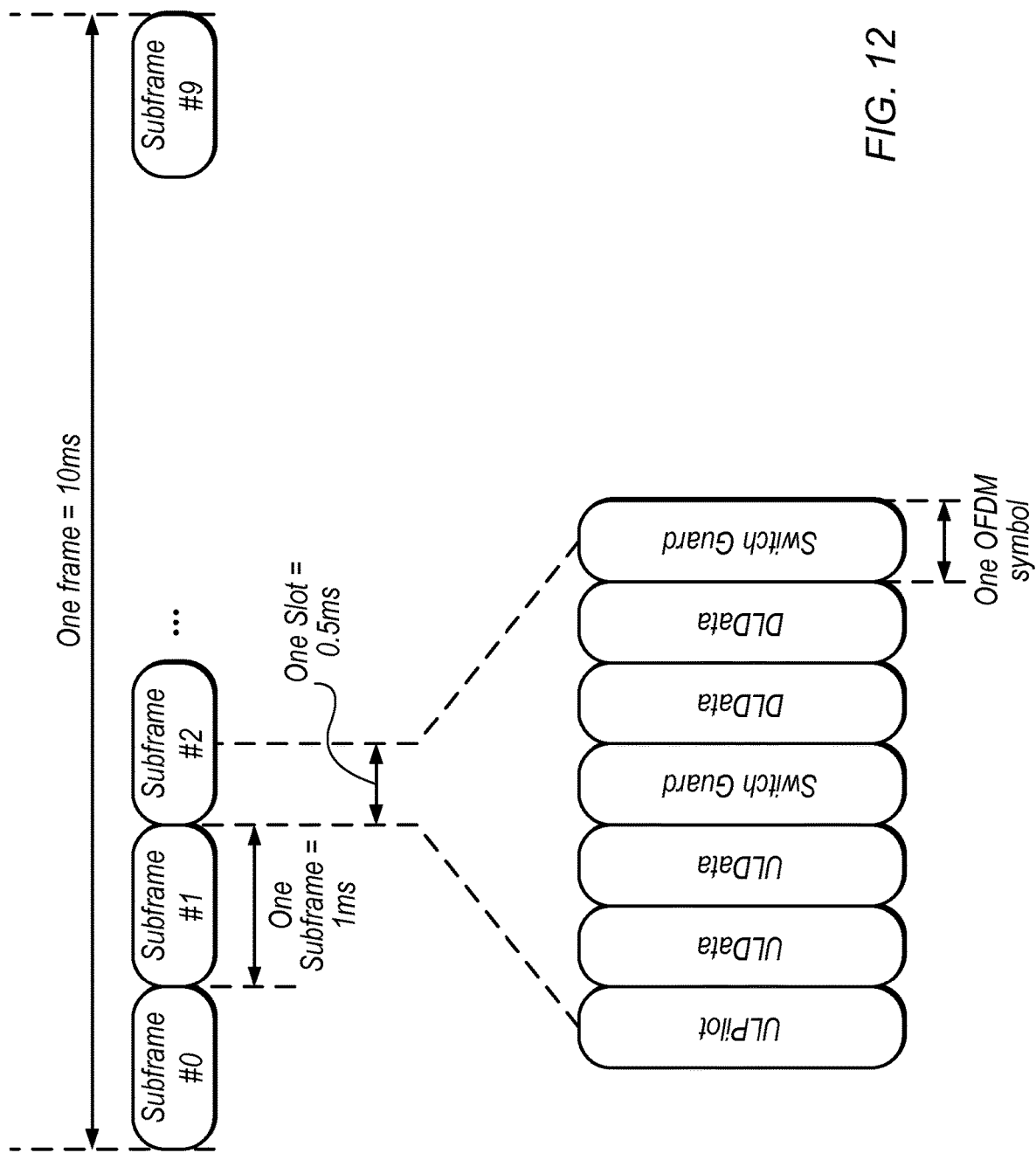
FIG. 12 is a diagram illustrating an exemplary frame structure for reciprocity-based massive MIMO communications, according to some embodiments.

FIG. 12 shows an exemplary data frame according to some embodiments. In the illustrated embodiment, each frame covers ten ms and includes ten subframes which each cover one ms in the time dimension. In contrast to the LTE frame of FIG. 10, however, in the illustrated embodiment each subframe (and each slot) includes both uplink and downlink data, as well as a switch guard symbol. In the illustrated embodiment, each slot (corresponding to half of a subframe) includes 7 OFDM symbols, one of which is used for an uplink pilot symbol, two of which are used for uplink data, two of which are used for downlink data, and two of which are used as guard symbols for switching between uplink and downlink. In the illustrated embodiment, the uplink pilot symbol and switch guard periods each consist of a single OFDM symbol.

In some embodiments, uplink pilot symbols are sequentially interleaved in the frequency dimension for users in the system. For example, each user's pilot data may be distributed across multiple separate subcarrier chunks. In some embodiments, pre-coded pilot information is also inserted into DL OFDM symbols to allow for compensation of RF chain responses.

In some embodiments, each frame starts with a down-link broadcasting subframe to set up initial network synchronization (e.g., for mobile devices 106 to synchronize carrier and/or sampling frequency with the base station). In some embodiments, the remaining nine subframes are used for UL and DL data transmission.

In various embodiments, different frame sizes, subframe sizes, number of OFDM symbols per slot, etc. may be implemented. In various embodiments, the turnaround time between receiving an uplink pilot symbol and transmitting the last downlink data that is encoded based on the uplink pilot symbol is less than 0.5 ms. In some embodiments, the turnaround time between receiving an uplink pilot symbol and transmitting the last downlink data that is encoded based on the uplink pilot symbol is less than the coherence time of the channel, which may vary over time, e.g., based on movement of source or receiver.

As used herein, the "coherence time" of a channel quantifies the similarity of the channel response at different times and refers to a time interval over which the impulse response to the channel is considered to be not varying. Coherence time is inversely proportional to doppler spread and is often estimated using the equation 0.423 times the maximum doppler frequency (e.g., as determined based on movement of the source and/or receiver). For example, the maximum doppler frequency of a transmitter moving directly towards a receiver is the frequency of the carrier wave times the velocity of movement divided by the speed of light.

Thus, in some embodiments, frame structures with short turnaround between uplink pilot receipt and downlink data transmission allow reciprocity to be used reliably even for fast-moving mobile devices 106. As discussed above, the distributed processing techniques disclosed herein may provide a short critical path for signals and processing needed to meet such a short turnaround time.

Further, the disclosed time dimension duplexing (TDD) techniques may be advantageous relative to frequency division duplexing (FDD) techniques because FDD systems may run out of unique pilot tones for a receiver to effectively resolve channel conditions, given the large number of antennas.

Figure 13:
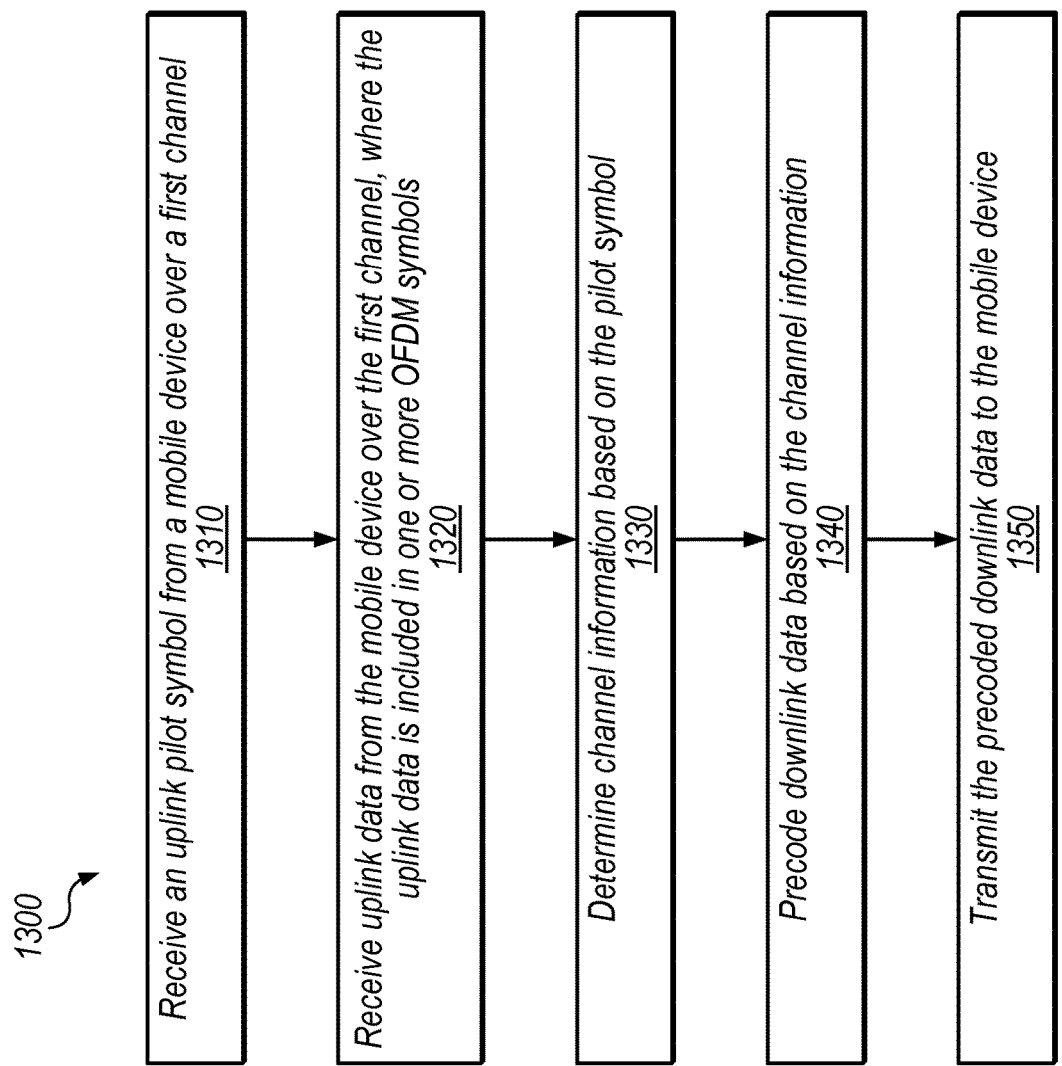
FIG. 13 is a flow diagram illustrating a method for using disclosed frame structures, according to some embodiments.

FIG. 13 shows a flow diagram illustrating one exemplary embodiment of a method 1300 for synchronization of radio circuitry. The method shown in FIG. 13 may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired. Flow begins at 1310.

At 1310 an uplink pilot symbol is received from a mobile device over a first channel. In some embodiments pilot symbols are allocated to users in an interleaved manner. In some embodiments the first channel is a wireless channel.

At 1320 uplink data is received from the mobile device over the first channel. In this embodiment, the uplink data is included in one or more orthogonal frequency-division multiplexing (OFDM) symbols.

At 1330 channel information is determined based on the pilot symbol. In some embodiments, MIMO detector 340, channel estimator 330, and/or link quality evaluator 350 are configured to determine this information within a single OFDM symbol, allowing greater time to performing downlink processing. In some embodiments, pilot information in a given OFDM symbol is processed by multiple MIMO detectors and/or channel estimators 330 in system 340. Thus, in some embodiments, pilot information for a given user is processed by multiple different processing elements.

At 1340 downlink data is precoded based on the channel information. In some embodiments, multiple MIMO precoders 345 are configured to perform this encoding and transmit their frequency portions to a bandwidth combiner 325.

At 1350 the precoded downlink data is transmitted to the mobile device. This transmission may be performed within the coherence time for a receiving device, allowing reciprocity-based precoding even for fast-moving devices. Further, it may allow precoding to be performed in the massive MIMO context with large numbers of antennas and user devices.

In some embodiments, a guard period between reception of the uplink data and transmission of the downlink data is only one OFDM symbol. In some embodiments, the transition time is less than one millisecond, which may be advantageous relative to the slower turnaround time for LTE TDD frames. In some embodiments, an interval between receiving the uplink pilot symbol and transmitting a final symbol of the precoded downlink data (the last symbol precoded based on the particular uplink pilot symbol), is less than a coherence time of the first channel. In some embodiments, the short turnaround time is achieved by separately decoding and/or precoding different time and/or frequency portions of uplink and/or downlink data and/or pilots (e.g., as discussed above with reference to FIG. 3). In some embodiments, base station 102 is configured to transmit a signaling schedule that specifies transmission intervals for the uplink pilot symbol, the uplink data, and the downlink data. User device may then communicate with base station 102 based on the signaling schedule. In some embodiments, base station 102 is configured to determine the channel information based on the pilot symbol within a time interval corresponding to a single OFDM symbol at the symbol rate.

In various embodiments, the disclosed massive MIMO system may have the following attributes: flexible software defined radios (SDRs) for acquiring and transmitting radio frequency (RF) signals, accurate time and frequency synchronization across the radio heads, high-throughput deterministic bus for moving and aggregating large amounts of data, and high-performance processing to meet real-time performance requirements. The system may also be quickly customized for a wide variety of operating conditions and/or research needs.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A base station, comprising:
   a plurality of antennas;
   a plurality of processing elements coupled to the plurality of antennas and configured to perform processing for wireless communications via the plurality of antennas;
   an interconnect configured to form a connection for communications between ones of the plurality of processing elements;
   wherein the base station is configured to combine signals received by multiple antennas of the plurality of antennas;
   wherein, for at least a subset of the plurality of processing elements, each processing element is configured to operate on a different portion of the combined signals in parallel, wherein each portion includes signals from multiple antennas of the plurality of antennas; and
   wherein the base station is configured to dynamically adjust, during operation and based on current operating conditions, the number of processing elements in the subset of processing elements configured to operate on different portions of the combined signals in parallel and wherein the base station is configured to dynamically adjust a size of the different portions of the combined signals operated on by each processing element in the subset of processing elements.

2. The base station of claim 1,
   wherein, for the at least a subset of the plurality of processing elements, each processing element is configured to operate on a different frequency portion of the signals received by multiple antennas of the plurality of antennas.

3. The base station of claim 1,
   wherein, for the at least a subset of the plurality of processing elements, each processing element is configured to operate on a different time portion of the signals received by multiple antennas of the plurality of antennas.

4. The base station of claim 1,
   wherein at least one of the plurality of processing elements is configured to combine signals from multiple antennas of the plurality of antennas to generate a combined signal for processing; and
   wherein at least one of the plurality of processing elements is configured to split signals from the combined signal into portions for processing.

5. The base station of claim 1, wherein, for the at least a subset of the plurality of processing elements, each processing element is configured to operate on the different portions of the combined signal by detecting one or more uplink pilot symbols and generating channel information based on the one or more uplink pilot symbols.

6. The base station of claim 5, wherein the base station is configured to configure transmit signals via multiple antennas of the plurality of antennas based on the channel information.

7. The base station of claim 6, wherein the base station is configured to precode different portions of the signals to be transmitted using at least a subset of the plurality of processing elements and wherein the base station is configured to combine the different portions and then split the combined portions for transmission via multiple antennas of the plurality of antennas.

8. A method, comprising:
   receiving wireless signals via a plurality of antennas;
   combining the received signals;
   providing different portions of the combined signals to multiple different processing elements for processing in parallel;
   transmitting, via the plurality of antennas, signals that are generated based on processing of the portions of the combined signals by the multiple different processing elements; and
   dynamically adjusting, during operation and based on current operating conditions, the number of the multiple different processing elements processing the different portions of the combined signals in parallel and a size of the different portions of the combined signals provided to each of the multiple different processing elements.

9. The method of claim 8, wherein the portions of the combined signals correspond to different frequency bands.

10. The method of claim 8, wherein the portions of the combined signals correspond to different time slots.

11. The method of claim 8, further comprising:
    precoding, using multiple different processing elements, based on the processing of the portions of the combined signals, the signals for transmission via multiple antennas of the plurality of antennas, wherein each of the multiple different processing elements precodes a different portion of the signals.

12. The method of claim 11, further comprising:
combining results of the precoding from the multiple different processing elements; and
splitting the combined results for transmission via different ones of the multiple antennas.

13. The method of claim 11, wherein the precoding is performed based on channel estimates for uplink pilot symbols in the received wireless signals.

14. The method of claim 8, wherein the plurality of antennas include more than eight antennas.

15. A non-transitory computer-readable medium having instructions stored thereon that are capable of causing or configuring a computing system to perform operations comprising:
receiving wireless signals via a plurality of antennas;
combining the received signals;
providing different portions of the combined signals to multiple different processing elements of a plurality of processing elements for separate processing in parallel; and
transmitting, via the plurality of antennas, signals that are generated based on processing of the portions of the combined signals by the plurality of processing elements; and
dynamically adjusting, during operation and based on current operating conditions, the number of the multiple different processing elements processing the different portions of the combined signals in parallel and a size of the different portions of the combined signals provided to each of the multiple different processing elements.

16. The non-transitory computer-readable medium of claim 15, wherein the portions of the combined signals correspond to different frequency portions.

17. The non-transitory computer-readable medium of claim 15, wherein the operations further comprise:
precoding, using multiple different processing elements of the plurality of processing elements, based on the processing of the portions of the combined signals, the signals for transmission via multiple antennas of the plurality of antennas, wherein each of the multiple different processing elements precodes a different portion of the signals;
combining results of the precoding from the multiple different processing elements; and
splitting the combined results for transmission via different ones of the multiple antennas.

18. The non-transitory computer-readable medium of claim 17, wherein the precoding is performed based on channel estimates for uplink pilot symbols in the received wireless signals.

19. The non-transitory computer-readable medium of claim 15, wherein the plurality of antennas include more than eight antennas.

* * * * *